US011790665B2

(12) United States Patent
Bangalore Ramaiah et al.

(10) Patent No.: US 11,790,665 B2
(45) Date of Patent: Oct. 17, 2023

(54) DATA DRIVEN DYNAMICALLY RECONFIGURED DISPARITY MAP

(71) Applicant: Hitachi Astemo, Ltd., Ibaraki (JP)

(72) Inventors: Naveen Kumar Bangalore Ramaiah, Farmington Hills, MI (US); Subrata Kumar Kundu, Canton, MI (US)

(73) Assignee: HITACHI ASTEMO, LTD., Hitachinaka (JP)

( * ) Notice: Subject to any disclaimer, the term of this patent is extended or adjusted under 35 U.S.C. 154(b) by 261 days.

(21) Appl. No.: 17/243,617

(22) Filed: Apr. 29, 2021

(65) Prior Publication Data

US 2022/0350995 A1 Nov. 3, 2022

(51) Int. Cl.
*G06V 20/58* (2022.01)
*G06T 7/70* (2017.01)
*G06T 7/11* (2017.01)
*G05D 1/02* (2020.01)
*G06T 9/00* (2006.01)
(Continued)

(52) U.S. Cl.
CPC ......... *G06V 20/584* (2022.01); *G05D 1/0246* (2013.01); *G06F 18/213* (2023.01); *G06T 7/11* (2017.01); *G06T 7/70* (2017.01); *G06T 9/00* (2013.01); *G06V 10/50* (2022.01);
(Continued)

(58) Field of Classification Search
CPC . G06T 2207/30252; G06T 2207/10016; G06T 7/70; G06T 7/0002; G06T 2207/10012; G06T 7/11; G06T 9/00; G06T 2207/20021; G06V 20/58; G06V 20/588; G06V 20/54; G06V 20/56; G06V 20/584; G06V 10/50; G06V 10/758; H04N 19/167; H04N 19/17; H04N 19/115; G05D 1/0246;
(Continued)

(56) References Cited

U.S. PATENT DOCUMENTS 8,867,790 B2   10/2014   Nanri et al.
9,443,313 B2    9/2016   Muramatsu et al.
(Continued)

FOREIGN PATENT DOCUMENTS

EP      3937491 A1 *  1/2022  ........... G05D 1/0016
WO  WO-2019202627 A1 * 10/2019  ................ B60T 7/22

OTHER PUBLICATIONS

Toward Community Sensing of Road Anomalies Using Monocular Vision—2016 (Year: 2016).*
(Continued)

*Primary Examiner* — Nizar N Sivji
(74) *Attorney, Agent, or Firm* — MATTINGLY & MALUR, PC

(57) ABSTRACT

In some examples, a system may receive, from at least one camera of a vehicle, at least one image including a road. The system may further receive vehicle location information including an indication of a location of the vehicle. In addition, the system may receive at least one of historical information from a historical database, or road anomaly information, where the road anomaly information is determined from at least one of a road anomaly database or real-time road anomaly detection. Based on the at least one image, the indication of the location of the vehicle, and the at least one of the historical information or the road anomaly information, the system may generate at least one of a disparity map or a disparity image.

18 Claims, 28 Drawing Sheets

(51) Int. Cl.
    *G06V 10/50* (2022.01)
    *G06V 10/75* (2022.01)
    *G06F 18/213* (2023.01)
(52) U.S. Cl.
    CPC .. *G06V 10/758* (2022.01); *G06T 2207/20021* (2013.01); *G06T 2207/30252* (2013.01)
(58) Field of Classification Search
    CPC ...... G06F 18/22; G06F 18/2411; G06F 16/00; G06F 18/213
    See application file for complete search history.

(56) References Cited

U.S. PATENT DOCUMENTS

| | | |
|---|---|---|
| 2009/0153664 A1 | 6/2009 | Higuchi et al. |
| 2009/0167844 A1* | 7/2009 | Seki ........................ H04N 7/181 348/47 |
| 2013/0058579 A1 | 3/2013 | Kawanishi et al. |
| 2013/0250109 A1 | 9/2013 | Yokota |
| 2016/0019683 A1* | 1/2016 | You ............................ G06T 7/74 382/103 |
| 2016/0300360 A1* | 10/2016 | Ariga ......................... G06T 7/11 |
| 2017/0323179 A1* | 11/2017 | Vallespi-Gonzalez ....................... B60R 11/04 |
| 2020/0041994 A1* | 2/2020 | Alalao .................... H04W 4/38 |
| 2020/0329342 A1* | 10/2020 | Beaurepaire ............ G06F 9/451 |
| 2020/0348665 A1* | 11/2020 | Bhanushali .......... H04N 19/167 |
| 2022/0035378 A1* | 2/2022 | Levi ....................... G06V 20/56 |

OTHER PUBLICATIONS

Road Quality Management System using Mobile Sensors—2017 (Year: 2017).*
Road Surface Segmentation based on Vertically Local Disparity Histogram for Stereo Camera—2016 (Year: 2016).*
International Search Report and Written Opinion received in corresponding International Application No. PCT/JP2022/006774 dated May 10, 2022.

* cited by examiner

| Feature Type | Feature Location | | | | | |
|---|---|---|---|---|---|---|
| | Far | | Middle | | Near | |
| | Bit Depth | Priority Level | Bit Depth | Priority Level | Bit Depth | Priority Level |
| Vehicle | 10 | 0 | 8 | 1 | 8 | 2 |
| Small Obstacle | 12 | 3 | 12 | 4 | 12 | 5 |
| Traffic Light | 10 | 6 | 10 | 7 | 8 | 8 |
| Traffic Sign | 10 | 9 | 10 | 10 | 12 | 11 |
| Tunnel/Low Light Area | 12 | 12 | 12 | 13 | 12 | 14 |

FIG. 10

| Feature Type | Far | | Middle | | Near | |
|---|---|---|---|---|---|---|
| | Image Compression Quality | Priority Level | Image Compression Quality | Priority Level | Image Compression Quality | Priority Level |
| Vehicle | Low Lossy/Lossless | 0 | Medium Lossy | 0 | Lossy | 0 |
| Small Obstacle | Low Lossy/Lossless | 3 | Low Lossy/Lossless | 3 | Low Lossy/Lossless | 3 |
| Traffic Light | Low Lossy/Lossless | 6 | Low Lossy/Lossless | 6 | Lossy | 6 |
| Traffic Sign | Low Lossy/Lossless | 9 | Medium Lossy | 9 | Lossy | 9 |
| Tunnel/Low Light Area | Low Lossy/Lossless | 12 | Low Lossy/Lossless | 12 | Low Lossy/Lossless | 12 |

Example Compression Algorithms:

Lossless: PNG
Low Lossy: JPEG with compression rate = 90%
Medium Lossy: JPEG with compression rate = 50%
Lossy: JPEG with compression rate = 10%

FIG. 13

| Color Difference (Minimum and Maximum) | Feature Location | | | | | |
|---|---|---|---|---|---|---|
| | Far | | Middle | | Near | |
| | Min | Max | Min | Max | Min | Max |
| | 4 | 8 | 8 | 16 | 12 | 20 |

FIG. 21

| Feature Type | Feature Location | Disparity Resolution | | |
|---|---|---|---|---|
| | | Far | Middle | Near |
| Vehicle | | 1x1 Pixel Dense | 1/2 Down Sampled | 1/4 Down Sampled |
| Small Obstacle | | 1x1 Pixel Dense | 1x1 Pixel Dense | 1x1 Pixel Dense |
| Tunnel/Low Light Area | | 1x1 Pixel Dense | 1x1 Pixel Dense | 1/2 Down Sampled |

FIG. 27

DATA DRIVEN DYNAMICALLY RECONFIGURED DISPARITY MAP

BACKGROUND

Advanced driver assistance systems (ADAS), as well as semi-autonomous vehicle systems, fully autonomous vehicle systems, or otherwise autonomous driving (AD) systems are systems that automate or otherwise enhance vehicle control for improved safety, automated navigation, and the like. These systems typically employ multiple types of sensors for recognizing the roadway and for recognizing and avoiding other vehicles, obstacles, pedestrians, etc. In particular, cameras are sensors that may be relied on to capture a visual representation of the vehicle's surrounding environment, such as for performing street recognition, sign recognition, obstacle avoidance, and the like.

Such systems may rely at least in part on creation of disparity maps for performing recognition functions based on received camera images. Higher density disparity maps are preferred for providing higher accuracy. However, generating higher density disparity maps can significantly increase the processing load on the vehicle processors.

SUMMARY

In some implementations, a system may receive, from at least one camera of a vehicle, at least one image including a road. The system may further receive vehicle location information including an indication of a location of the vehicle. In addition, the system may receive at least one of historical information from a historical database, or road anomaly information, where the road anomaly information is determined from at least one of a road anomaly database or real-time road anomaly detection. Based on the at least one image, the indication of the location of the vehicle, and the at least one of the historical information or the road anomaly information, the system may generate at least one of a disparity map or a disparity image.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIG. 10 illustrates an example bit-depth priority table according to some implementations.

FIG. 13 illustrates an example compression priority table according to some implementations.

FIG. 21 illustrates an example color difference threshold table according to some implementations.

FIG. 27 illustrates an example resolution table according to some implementations.

DESCRIPTION

Figure 1:
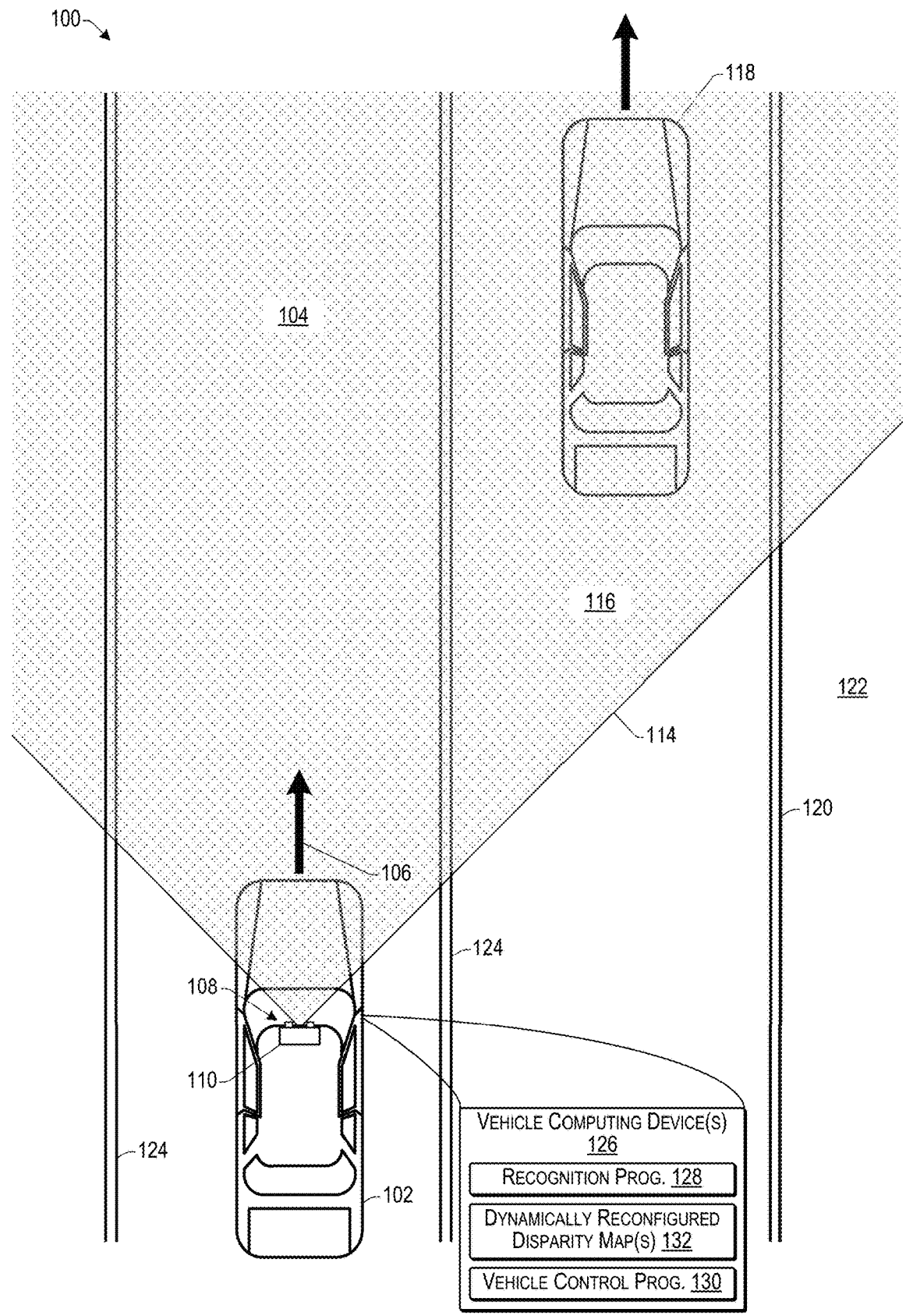
FIG. 1 illustrates an example recognition system configured for performing recognition of the surroundings of a vehicle according to some implementations.

Some implementations herein are directed to techniques and arrangements for efficiently and dynamically generating a disparity map or disparity image that may be used for detecting obstacles, road anomalies, and other features with high-depth accuracy in various scenarios without substantially increasing the processing load on the vehicle processors. Examples herein may include generating highly accurate disparity maps that may be used for detecting features and their respective distances with corresponding higher accuracy. In some cases, a history map database may be developed from operator monitoring data and other data received from a plurality of vehicles, and may be used to improve the efficiency of generating the disparity maps herein. Accordingly, the techniques herein enable generation of highly accurate disparity maps using lower computing requirements and thereby provide improved safety for ADAS and AD systems.

As one example, a processor on the vehicle may receive at least one image capturing the road or other travel path from at least one camera of the vehicle. The processor may also receive vehicle location information including an indication of a current location of the vehicle, such as based on GPS (Global Positioning System) information or the like, which may indicate a current lane in which the vehicle is traveling. The processor may also receive at least one of historical information from a historical database or road anomaly information from a road anomaly database.

The processor may generate a disparity map or disparity image based on the at least one image, the indication of the location of the vehicle, and the historical information and/or the road anomaly information. For example, the disparity map or disparity image may have some areas of higher disparity density and some areas of lower disparity density that are dynamically determined based on the received information. In particular, areas determined to include potential obstacles, road anomalies, or other areas determined to be of interest may be processed to have higher density disparity information, while other areas of the disparity map or disparity image may be processed to have lower density disparity information, e.g., sparse disparity information. Thus, by processing dynamically only selected portions of the disparity map or disparity image to have dense disparity information, while processing a remainder of the disparity map or disparity image to have lower density or sparse disparity information, considerable computing resources may be conserved.

In some implementations, the system herein may include at least one mono camera system or stereo camera system that may be mounted on the vehicle so that a wide angle field of view (FOV) of the camera(s) is generally parallel to the road surface under normal conditions. The FOV of the camera(s) may be wide enough to capture the front road and roadside objects. Further, the system herein is not limited to capturing only the road in front of the vehicle. For instance, in some examples, the camera(s) may additionally, or alternatively, be mounted on the rear of the vehicle and/or on the sides of the vehicle to detect the vehicle's entire surrounding region.

Some examples include improving disparity map accuracy for detecting obstacles, road anomalies, and other features. For example, the system may detect features and distances to features very accurately thereby significantly improving safety vehicle safety. There are few conventional techniques available to improve the accuracy of disparity images generated based on images captured by cameras Implementations herein may use data driven information to realize more accurate disparity maps with efficient utilization of computing resources. For instance, the data driven information may be used to select bit-depth (image quality) at the pixel level, optimal image compression levels and methods, and/or estimate disparity parameters dynamically to generate the improved dynamically configurable disparity maps herein under various real-world scenarios. Accordingly, the data driven dynamically reconfigurable disparity map techniques and arrangement herein provide significant benefits for improving safety and comfort to vehicle occupants.

Some examples may rely only on images received from the camera system and information received over a network for selecting priority areas in the received images, selecting image compression methods to use, dynamically selecting pixel bit-depth, and dynamically determining an optimal search range for dynamically calculating a disparity range. For instance, some implementations may employ Internet of things (IoT) information to select priority areas, determine image quality, and determine image compression methods to use for calculating the disparity maps.

The implementations herein may employ a historic map to select the areas of interest in images and may select higher priority areas for generating dense disparity information for those higher priority areas while generating more sparse disparity information for areas outside the higher priority areas. Accordingly, implementations herein are not limited to determining priority areas based on detected obstacles, road anomalies, or other features, but instead may use the history map to decide the resolution of different areas of the disparity map ahead of time. In some examples, the determination of the higher priority areas may be further based on Internet of things (IoT) information, e.g., information such as current and past operator monitoring system output, road anomalies stored in a road anomaly database and/or detected in real time, and current and past traffic movements, directions, congestions, etc., which may all be included in the historic map.

In addition, based on the historic map and selected higher priority areas, a suitable pixel bit-depth and image quality may be selected. Further, based on the historic map and selected higher priority areas, suitable image compression levels and algorithms may be selected prior to generating a disparity map from the image. Additionally, a disparity search range may be estimated dynamically in real time for the selected higher priority areas to enable efficient generation of higher density disparity information for the higher priority areas.

Some examples herein may provide significant benefits for current and future semi-autonomous and fully autonomous vehicles to estimate very accurate disparity maps, thereby detecting features and feature distances with high accuracy. For instance, the techniques herein may be executed using various types of processors, such as embedded processors (e.g., an AD/ADAS electronic control unit (ECU) or other types of ECUs), general purpose CPUs, specialty processors, as well as processors of mobile devices, such as smartphones, tablet computing devices, or the like. Further, implementations herein are not limited to passenger vehicles, but may be applied to any vehicle that includes semi-autonomous or fully autonomous capability, such as shuttle buses, trucks, trains, ships, and so forth.

For discussion purposes, some example implementations are described in the environment of generating disparity images with dynamically determined dense disparity areas based on detecting and recognizing potential obstacles or other features of interest. However, implementations herein are not limited to the particular examples provided, and may be extended to other types of cameras, other types of vehicles, other types of roads and features, other weather conditions, and so forth, as will be apparent to those of skill in the art in light of the disclosure herein.

FIG. 1 illustrates an example recognition system 100 configured for performing recognition of the surroundings of a vehicle 102 according to some implementations. In this example, suppose the vehicle 102 is traveling on a roadway or other travel path 104 in a direction indicated by arrow 106. The recognition system 100 herein may include at least one camera system 108, which may be mounted on the vehicle 102. In the illustrated example, the camera system 108 may include one or more cameras 110. In this example, the camera(s) 110 include a stereo camera. In other examples, the camera system 108 may include one or more mono cameras instead of or in addition to a stereo camera as the camera(s) 110. Additionally, while the camera(s) 110 in the camera system 108 are illustrated as being located on the vehicle roof in this example, in other examples, the camera (s) 110 may be located at any of various different locations on the vehicle 102.

In the illustrated example, a field of view (FOV) 114 of the camera(s) 110 may be wide enough to capture the road or other travel path 104 in front of the vehicle 102, may encompass other lanes 116, other vehicle(s) 118, a roadside lane marker 120, roadside area 122, lane markings 124, and so forth. In some cases, the camera system 108 may capture images corresponding to the FOV 114 continually while the vehicle 102 is in operation, e.g., at 10 frames per second, 15 frames per second, 30 frames per second, 60 frames per second, or any other desired frequency that provides images at a high enough rate to enable recognition of the travel path 104 and any obstacles or road anomalies in the travel path in time to take evasive action or otherwise adapt to the recognition information. For instance, the image capturing frequency (sampling frequency) of the camera system 108 may increase as the vehicle speed increases.

The vehicle 102 may include one or more vehicle computing devices 126, as discussed additionally below. The vehicle computing device(s) 126 may execute a recognition program 128 and a vehicle control program 130. In some cases, the recognition program 128 may receive the images captured by the cameras of the camera system 108 and may perform processing on the images to perform recognition for the current travel path 104 of the vehicle 102 based on one or more dynamically reconfigured disparity maps 132. For instance, the dynamically reconfigured disparity map(s) 132 may be reconfigured dynamically to have some regions of interest with higher density disparity information and other regions having lower density disparity information. The recognition program 128 may provide recognition information about detected and recognized obstacles, road anomalies, and other features to the vehicle control program 130, which may initiate one or more actions based on the recognition information, such as issuing an alert for warning a vehicle occupant, braking the vehicle 102, accelerating the vehicle, steering one or more wheels of the vehicle 102, or the like.

In some cases, the camera system 108 may include at least one vehicle computing device 126 that executes the recognition program 128. In other cases, the vehicle computing device(s) 126 may be separate from the camera system 108, and located elsewhere in the vehicle 102 for executing the recognition program 128. In either case, the vehicle computing device(s) 126 may receive images from the camera system 108 and may process the images to detect features, such as the road, road characteristics, road anomalies, signs, obstacles, other vehicles, and the like.

In some examples, the recognition program 128 may generate a disparity map from the received images, e.g., using stereo camera images, mono camera images, or images taken from multiple mono cameras. In the case that a mono camera is used, a depth map may be calculated using a trained machine learning model (not shown in FIG. 1). For instance, initially, a set of monocular images and their corresponding ground-truth parallax maps may be captured and used for training the machine learning model. Subsequently, the machine learning model may be used to predict approximate values of the parallax map as a function of newly captured images.

Alternatively, in the case of a stereo camera or multiple cameras, images may be captured by two or more cameras. The captured images may be used to calculate a parallax using block matching techniques, such as semi-global block matching or any other suitable technique. Parallax information may be used to generate a disparity map and/or disparity image. In some examples herein, a stereo camera system is used as an example system to explain some example implementations, but those of skill in the art will understand that similar arrangements and techniques may be applied using systems having a single mono camera or multiple mono cameras as well.

In a stereo camera system, synchronized right and left camera images may be captured using an image acquisition system, which may have distortion due to the displacement in camera during the installation, or during unfavorable driving conditions. Additionally, distortion might be caused by the lenses attached to the stereo camera. After the stereo images are acquired, a calibration matrix image rectification may be carried out in some examples to remove distortion and re-project the images onto a projection plane that is parallel to a line joining the two cameras. This enables the epipolar lines in the left and right image to coincide. According to the examples, herein, by aligning the two cameras to be coplanar, a search to create the disparity map may be simplified to one dimension, e.g., a horizontal line parallel to the baseline between the left and right cameras. With rectified stereo images, depending on ECU capability, a stereo block matching algorithm may be used to calculate the disparity map or disparity image.

After the stereo images are captured and rectified based on calibration information, stereo matching may be performed on the rectified images, such as with predefined region of interest (ROI). For instance, disparity with predefined resolution for each pixel may be estimated by block matching techniques. This may include searching one of the images of an image pair for the best corresponding region for a template in the other image. The template may be shifted along the epipolar line in a predefined fixed disparity range. The process may be repeated until the disparity has been estimated for all pixels in the right image. A conventional technique may calculate either sparse disparity or dense disparity for the whole image, such as based on the ECU's processing capability.

The depth estimation for a feature based on images captured by a stereo camera may be dependent on the density of the disparity map created using the stereo images acquired from the left and right cameras of the stereo camera. A dense disparity map or otherwise higher-resolution disparity map may provide highly reliable and precise depth information for all the pixels in the image. On the other hand, a sparse disparity or otherwise lower-resolution disparity map may also include high precision depth information, but only for a limited number of pixels. Some conventional systems may use fixed ROIs for left and right camera images of a stereo camera and may calculate either sparse or dense disparity maps for the entire image. However, calculating a dense disparity map for a fixed ROI may often be computationally expensive and inefficient. On the other hand, a sparse disparity map with a fixed ROI may not be suitable for all AD/ADAS applications since the accuracy may be low.

Furthermore, a quality of a pixel may be referred to as bit-depth (e.g., 8-bits, 10-bits, 12-bits, 16-bits, etc.) of stereo images and the image compression method use may also affect the reliability and precision of creating a disparity map. For instance, the use of low bit-depth images (e.g., 8 bits) with lossy image compression may lead to low memory requirements but may yield sparse disparity maps. On the other hand, higher bit-depths with lossless image compression methods may yield dense disparity maps; however, this may lead to higher memory requirements thereby increasing the total system processing and memory capabilities.

Furthermore, disparity parameters such as search range may also be considered in creating a disparity map or disparity image. For instance, the search range may define the minimum and maximum disparity value in a given stereo image pair. Conventional techniques may employ either a fixed search range (for example: search range 0-250) for an entire image to calculate the disparity map without taking into consideration various different scenarios and/or a type of the obstacle, road anomaly, or other features. This may lead to an increase in processing time, and may require more powerful processors for use in a real-time system.

To address these issues, the system herein may generate a disparity map that is able to provide reliable feature detection, high accuracy depth estimation, and may meet a vehicle manufacturer's requirements for lower system costs. For example, implementations herein may generate a disparity map or disparity image by dynamically deciding priority areas within the image, such as based on data driven information obtained from a history database and determined via a history map. Furthermore, implementations herein may consider the priority areas when deciding a bit-depth for each pixel (e.g., the pixel's quality) and the image compression method to reduce the memory requirements and improve the depth estimation for all obstacles, road anomalies, and other features in all likely scenarios.

In addition, some examples herein may estimate the disparity parameters dynamically. such as to calculate the dense and sparse disparity map using edge and disparity information, thereby improving depth estimation with lower system requirements. Further, while some examples may create and reconfigure a disparity map using stereo camera images, similar techniques may be applied for images captured by one or more mono cameras.

Figure 2:
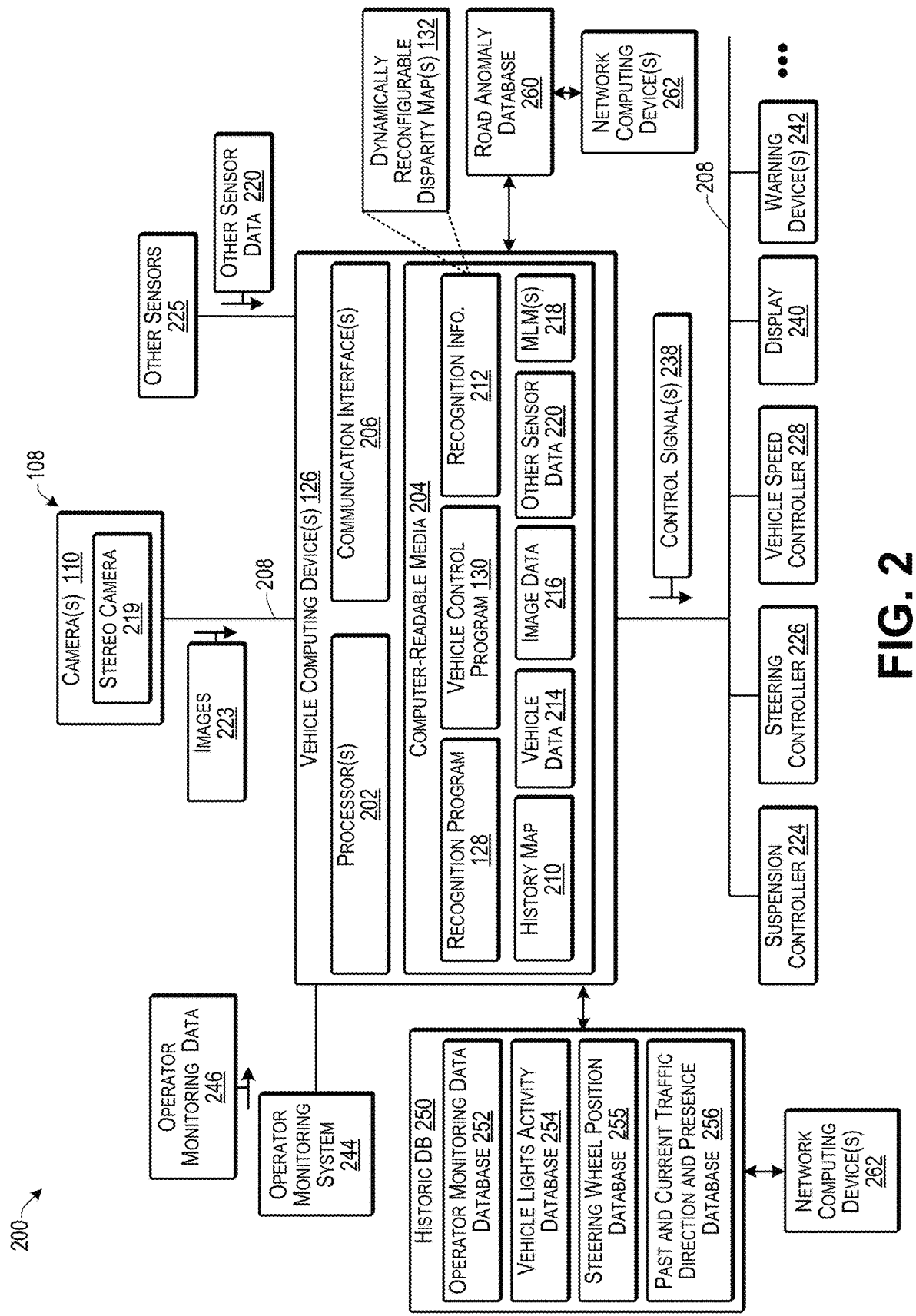
FIG. 2 illustrates an example architecture of a recognition system that may be included in the vehicle according to some implementations.

FIG. 2 illustrates an example architecture of a recognition system 200 that may be included in the vehicle 102 according to some implementations. Each vehicle computing device 126 may include one or more processors 202, one or more computer-readable media 204, and one or more communication interfaces 206. In some examples, the vehicle computing device(s) 126 may include one or more ECUs or any of various other types of computing devices. For instance, the computing device(s) 126 may include one or more ADAS/AD ECUs for controlling critical vehicle systems to perform ADAS and/or AD tasks, such as navigation, braking, steering, acceleration, deceleration, and so forth. The computing device(s) 126 may also include other ECUs for controlling other vehicle systems.

ECU is a generic term for any embedded system that controls one or more of the systems, subsystems, or components in a vehicle. Software, such as the recognition program 128 and the vehicle control program 130 may be executed by one or more ECUs and may be stored in a portion of the computer-readable media 204 (e.g., program ROM) associated with the respective ECU to enable the ECU to operate as an embedded system. ECUs may typically communicate with each other over a vehicle bus 208 according to a vehicle bus protocol. As an example, the Controller Area Network bus (CAN bus) protocol is a vehicle bus protocol that allows ECUs and other vehicle devices and systems to communicate with each other without a host computer. CAN bus may include at least two different types. For example, high-speed CAN may be used in applications where the bus runs from one end of the environment to the other, while fault-tolerant CAN is often used where groups of nodes are connected together.

Each ECU or other vehicle computing device 126 may include one or more processors 202, which may include one or more of central processing units (CPUs), graphics processing units (GPUs), microprocessors, microcomputers, microcontrollers, digital signal processors, state machines, logic circuits, and/or any devices that manipulate signals based on operational instructions. As one example, the processor(s) 202 may include one or more hardware processors and/or logic circuits of any suitable type specifically programmed or configured to execute the algorithms and other processes described herein. The processor(s) 202 may be configured to fetch and execute computer-readable instructions stored in the computer-readable media 204, which may program the processor(s) 202 to perform the functions described herein.

The computer-readable media 204 may include volatile and nonvolatile memory and/or removable and non-removable media implemented in any type of technology for storage of information, such as computer-readable instructions, data structures, programs, program modules, and other code or data. For example, the computer-readable media 204 may include, but is not limited to, RAM, ROM, EEPROM, flash memory or other memory technology, optical storage, solid state storage, magnetic disk, cloud storage, or any other medium that can be used to store the desired information and that can be accessed by a computing device. Depending on the configuration of the vehicle computing device(s) 126, the computer-readable media 204 may be a tangible non-transitory medium to the extent that, when mentioned, non-transitory computer-readable media exclude media such as energy, carrier signals, electromagnetic waves, and/or signals per se. In some cases, the computer-readable media 204 may be at the same location as the vehicle computing device 126, while in other examples, the computer-readable media 204 may be partially remote from the vehicle computing device 126, such as accessible over a wireless network or the like.

The computer-readable media 204 may be used to store any number of functional components that are executable by the processor(s) 202. In many implementations, these functional components comprise instructions or programs that are executable by the processor(s) 202 and that, when executed, specifically program the processor(s) 202 to perform the actions attributed herein to the vehicle computing device 126. Functional components stored in the computer-readable media 204 may include the recognition program 128 and the vehicle control program 130, each of which may include one or more computer programs, applications, executable code, or portions thereof. Further, while these programs are illustrated together in this example, during use, some or all of these programs may be executed on separate vehicle computing device(s) 126.

In addition, the computer-readable media 204 may store data, data structures, and other information used for performing the functions and services described herein. For example, the computer-readable media 204 may store a history map 210, recognition information 212, vehicle data 214, image data 216, one or more machine learning models (MLM(s)) 218, other sensor data 220, and so forth. As discussed additionally below, the recognition information 212 may include the dynamically reconfigured disparity map(s) 132 discussed above. Further, while these data and data structures are illustrated together in this example, during use, some or all of these data and/or data structures may be stored by or with separate computing device(s) 126. The computing device(s) 126 may also include or maintain other functional components and data, which may include programs, drivers, etc., and the data used or generated by the functional components. Further, the computing device(s) 126 may include many other logical, programmatic, and physical components, of which those described above are merely examples that are related to the discussion herein.

As mentioned above, in the case that a mono camera is used as the camera(s) 110, a depth map may be calculated using one or more trained machine learning models 218. For instance, initially, a set of monocular images and their corresponding ground-truth parallax maps may be captured and used for training the machine learning model(s) 218. Subsequently, the machine learning model(s) 218 may be used to predict approximate values of the parallax map as a function of newly captured images.

The one or more communication interfaces 206 may include one or more software and hardware components for enabling communication with various other devices, such as over the vehicle bus 208 and/or over one or more network(s) (not shown in FIG. 2). For example, the communication interface(s) 206 may enable communication through one or more of a LAN, the Internet, cable networks, cellular networks, wireless networks (e.g., Wi-Fi) and wired networks (e.g., CAN, Fibre Channel, fiber optic, Ethernet), direct connections, as well as close-range communications such as BLUETOOTH®, and the like, as additionally enumerated elsewhere herein.

In this example, the camera(s) 110 in the camera system 108 include a stereo camera 219. In other examples, the camera(s) 110 may include one or more mono cameras. The computing device(s) 126 may be able to communicate with the camera system 108 via the vehicle bus 208, direct connection, or any other type of connection for receiving images 223 (e.g., left and right images) from the camera system 108. For example, as discussed in detail below, the recognition program 128 may receive the images 223 from the camera system 108, and may perform recognition of features in the images 223. The image data 216 may include the images 223 received from the camera system 108 as well as other image information such as metadata or processed images. For instance, some or all of the images 223 may be received as raw images without any substantial processing. Alternatively, in other examples, as discussed additionally below, e.g., with respect to FIG. 3, the camera system 108 may perform image processing and recognition in the images 223 rather than sending the raw images 223 to the vehicle computing device 126.

In addition, the computing device(s) 126 may receive vehicle data 214 from other systems and/or other sensors in the vehicle. For instance, in addition to the camera system 108, the vehicle may include a plurality of other sensors 225 that may provide sensor information used by the vehicle control program 130. Several non-exhaustive examples of other sensors 225 may include radar, LIDAR, ultrasound, a global positioning system (GPS) receiver, other cameras, e.g., facing in other directions, and the like. In addition, the vehicle data 214 used by the vehicle control program 130 may include information received from or associated with various vehicle systems, such as from a suspension controller 224 associated with the suspension system, a steering controller 226 associated with the steering system, a vehicle speed controller 228 associated with a braking and acceleration system, and so forth.

As one example, the recognition program 128 may receive the images 223 from the camera system 108 continually, e.g., as the camera system 108 captures images 223 of the travel path or other surroundings of the vehicle while the vehicle is in motion. Furthermore, the recognition program 128 may process the received images 223 to recognize road anomalies, obstacles, and other features. As discussed additionally below, the recognition information 212 may include one or more dynamically reconfigured disparity maps 132 having one or more higher density disparity regions and one or more lower density disparity regions.

The recognition program 128 may provide the recognition information 212 about any recognized obstacles, road anomalies, other features, etc., to the vehicle control program 130, which may take one or more actions in response to the recognition information 212. In some examples, the vehicle control program 130 and/or the recognition program 128 may fuse or otherwise combine and consolidate the recognition information 212 determined from the images 223 with the other sensor data 220 for providing additional available information to the vehicle control program 130 for controlling the vehicle.

As one example, the vehicle control program 130 may use rule-based and or artificial intelligence-based control algorithms to determine parameters for vehicle control. For instance, the vehicle control program 130 may apply one or more machine learning models for determining an appropriate action, such as braking, steering, decelerating, accelerating, or the like. Furthermore, the vehicle control program 130 may send one or more control signals 238 to one or more vehicle systems in response to the recognition information 212. For example, the vehicle control program 130 may send control signals 238 to the suspension controller 224, the steering controller 226, and/or the vehicle speed controller 228. For instance, the control signals 238 may include a specified spring coefficient and/or damping control information sent to the suspension controller 224; specified steering angle sent to the steering controller 226 for steering one or more wheels; and/or specified braking or acceleration control information sent to the vehicle speed controller 228.

In addition, or alternatively, such as in the case that the vehicle is under control of a human operator, the vehicle control program 130 may send a control signal 238 to a display 240 to present an alert and/or to one or more warning devices 242 such as an audible or visual warning device. Examples of warning devices 242 include speakers that may generate an audible alert, haptic devices that may generate a vibration or other type of tactile alert (e.g., in a seat or steering wheel), and/or a visual signaling device that may generate a visual alert.

In some examples, the vehicle may include an operator monitoring system 244 that provides operator monitoring data 246 to the vehicle computing device(s) 126. For example, the operator monitoring system 244 may monitor the gaze direction, head position, steering wheel position, brake light activity, turn signal activity, accelerator activity, and other information about the operator of the vehicle and/or actions performed by the operator of the vehicle for providing operator monitoring data 246 to the vehicle computing device(s) 126. For example, the operator monitoring data 246 may be received by the recognition program 128 four use, at least in part, in generating the history map 210.

In addition, the vehicle computing device 126 may be in communication with a historic database 250 that may provide additional information to the vehicle computing device(s) 126 for generating the history map 210. For example, the historic database 250 may include operator monitoring data database 252, a vehicle lights activity database 254, a steering wheel position database 255, and past and current traffic direction and presence database 256. The information in the historic database 250 may be received from the vehicle 102 and also from a plurality of other vehicles for establishing a history associated with each location on each roadway or other travel path on which vehicles travel.

Furthermore, the vehicle computing device(s) 126 may be in communication with a road anomaly database 260 that may include information about road anomalies, such as potholes, irregular surfaces, speedbumps, and the like. For example, the road anomaly database 260 may be compiled using road anomaly information that has been provided by a large number of vehicles and may provide information about road anomalies encountered at each location on each roadway or other travel path on which vehicles travel. Additionally, as mentioned above, real time obstacle detection, road anomaly detection, and other feature detection by the recognition program 212 may also be taken into consideration when determining higher priority areas of the disparity image.

In some examples, the road anomaly database 260 and/or the historic database 250 may be stored locally on computer readable media on the vehicle itself. In other examples, the historic database 250 and/or the road anomaly database 260 may be stored in the cloud such as on one or more network computing device(s) 262 and may be accessible over a network. For instance, the network computing device(s) 262 may be accessed by the vehicle computing device(s) 126 in real time while the vehicle is operating, or may be accessed upon determining a destination to acquire information for traveling to the destination. In the case that the historic database 250 and/or the road anomaly database 260 are stored at least partially locally on the vehicle 102, these databases may be updated periodically by accessing updated information from primary databases stored at network computing device(s) 262. In addition, as the vehicle traverses a route, new information regarding road anomalies, features detected, traffic patterns detected, and so forth may be uploaded to the network computing devices to update and expand the historic database 250 and/or the road anomaly database 260 for future use by the vehicle 102 and other vehicles.

Figure 3:
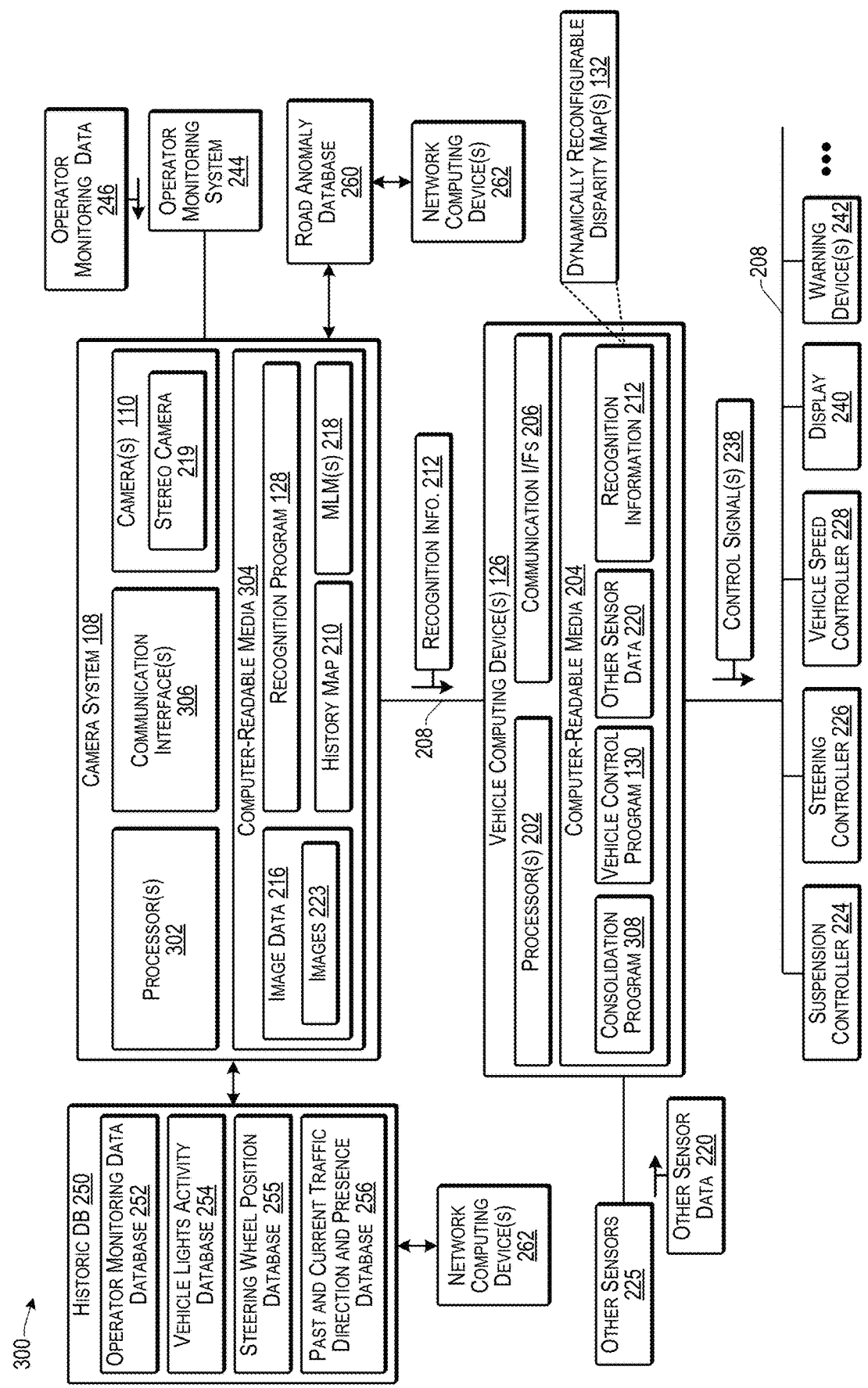
FIG. 3 illustrates an example architecture of a recognition and vehicle control system that may be included in the vehicle according to some implementations.

FIG. 3 illustrates an example architecture of a recognition and vehicle control system 300 that may be included in the vehicle 102 according to some implementations. In this example, the camera system 108 may include processing capability for determining recognition information 212 independently of the vehicle computing device(s) 126. Accordingly, the camera system 108 includes one or more processors 302, one or more computer readable media 304, and or more communication interfaces 306. The one or more processors 302 may be or may include any of the processors 202 discussed above with respect to FIG. 2, or other suitable processors for performing the operations described herein. Furthermore, the one or more computer readable media 304 may be or may include any of the computer readable media 204 discussed above with respect to FIG. 2, or other suitable computer readable media. Similarly, the communication interfaces 306 may be or may include any of the communication interfaces 206 discussed above with respect to FIG. 2 or other suitable communication interfaces.

In addition, the camera system 108 includes the camera(s) 110, which may include one or more lenses, one or more focusing systems, and one or more image sensors, as is known in the art. In this example, the camera(s) 110 include the stereo camera 219. In other examples, the camera(s) 110 may include one or more mono cameras. The camera system 108 may execute the recognition program 128 on the one or more processors 302. Accordingly, the stereo camera 219 may capture images 223 in its FOV and may store the images 223 to the computer readable media 304 as part of the image data 216.

In some examples, the recognition program 128 may continually receive images 223 from the camera(s) 110 in a buffer in the computer readable media 304 as the respective images 223 are captured. Further, the recognition program 128 may perform recognition processing on the received images 223, which may include the generation of dynamically reconfigured disparity maps 132 based at least in part on the history map 210, as described in additional detail below. For example, the history map 210 may be generated based on information such as current and past operator monitoring data 246, real-time road anomaly information detected by the recognition program, historic road anomaly information received from a road anomaly database 260, current and past traffic movements, directions, and other information, as discussed additionally below. The recognition program 128 may then send the recognition information 212 to the vehicle computing devices 126 in real time (e.g., while the vehicle is in motion and in time for performing navigation functions in response to detected obstacles, road anomalies, or other features). The vehicle control program 130 may then process the recognition information 212 for controlling the vehicle as discussed above with respect to FIG. 2 and as discussed additionally below.

In some examples, the vehicle computing device(s) 126 may execute a consolidation program 308 that may initially receive the recognition information 212 and that may also receive the other sensor data 220. For example, the consolidation program 308 may compare and reconcile the recognition information 212 with the other sensor data 220 to provide a more complete indication of the surroundings of the vehicle to the vehicle control program 130. Similar to the example of FIG. 2 discussed above, the vehicle control program 130 may send one or more control signals 238 to one or more vehicle systems 224, 226, 228, 240, and/or 242 based on the received recognition information 212 and the other sensor data 220.

Furthermore, similar to the example of FIG. 2 discussed above, the recognition program 128 may receive information for constructing the history map 210, such as receiving information from the operator monitoring system 244, the historic database 250, and/or the road anomaly database 260. Additional details of constructing and using the history map 210 are discussed below, e.g., the with respect to FIG. 6.

Figure 4:
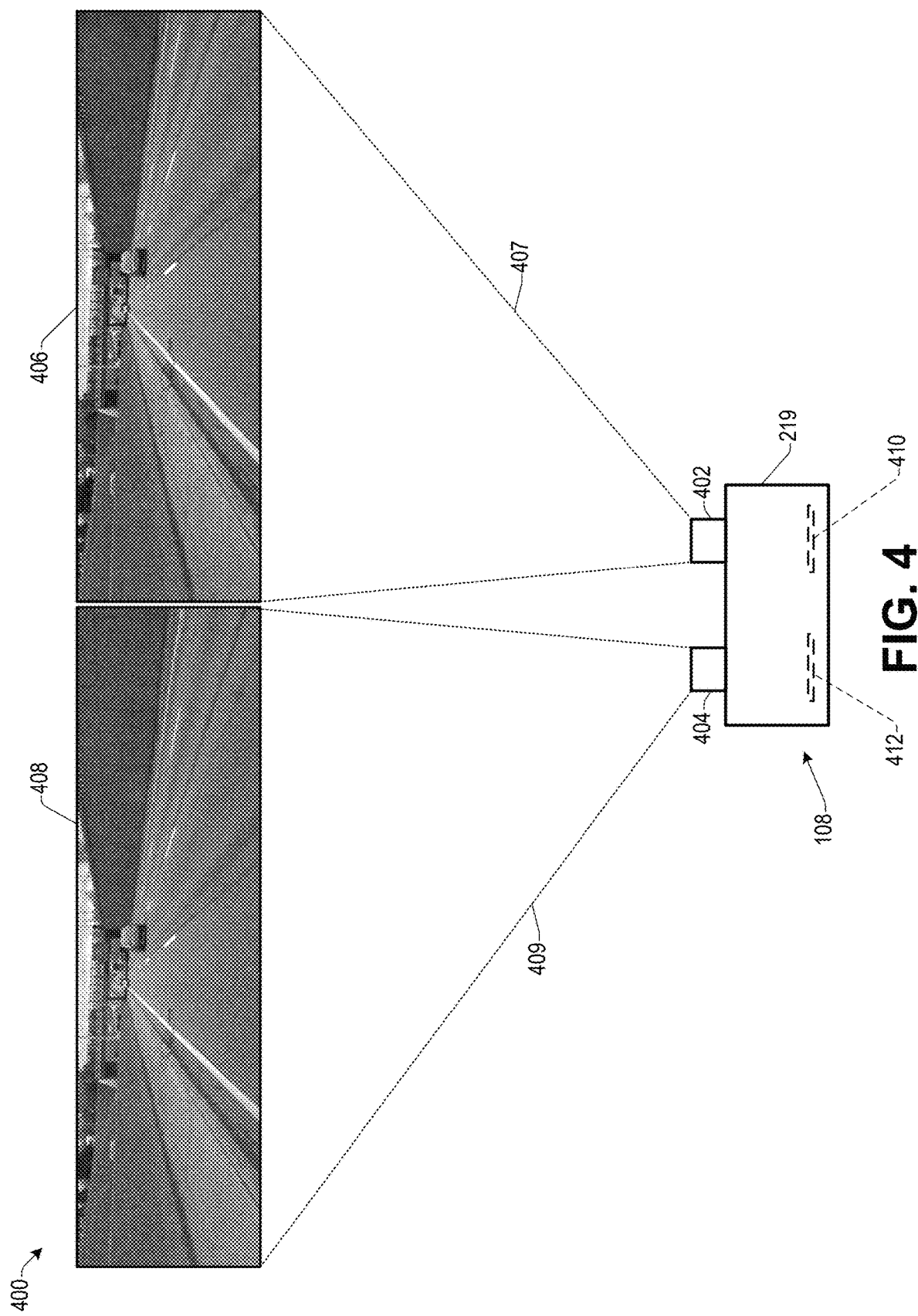
FIG. 4 illustrates an example of image capture performed by the camera system 108 according to some implementations.

FIG. 4 illustrates an example 400 of image capture performed by the camera system 108 according to some implementations. In this example, the camera system 108 includes the stereo camera 219. For instance, the stereo camera 219 may include a right lens 402 and a left lens 404. The right lens 402 may capture a right image 406 within a right field of view (FOV) 407 and the left lens 404 may capture a left image 408 within a left FOV 409. In the illustrated example, the stereo camera 219 includes a right image sensor 410 for capturing images through the right lens 402 and a left image sensor 412 for capturing images through the left lens 404. In other examples, the stereo camera 219 may include a single image sensor (not shown in FIG. 4) that alternately captures images through the right lens 402 and the left lens 404.

The system (e.g., the system 100, 200, and/or 300) may use the right and left images 406 and 408, respectively, to determine a parallax image which is referred to as a disparity image. For instance, the system may calculate the disparity image using the stereo right and left images 406 and 408, such as based on a block matching method. As one example, as is known in the art, if a point $P_L=(u1, v1)$ in the left image 408, the corresponding point $P_R=(u2, v2)$ in the right image 406 may be at the same height as $P_L$ when v1=v2 as measured from a common baseline. Thus, the parallax measurement may be determined using a simple stereo camera theory in which the parallax may be defined as:

$$d=u2-u1 \qquad \text{EQ(1)}$$

Based on the determined parallax, implementations herein may determine the disparity image by determining the depth information of a 3D point from the parallax since the disparity is inversely proportional to the corresponding parallax. Accordingly, the depth may be calculated using left and right images and the actual disparity, e.g.:

$$Z=fb/d \qquad \text{EQ(2)}$$

where Z is the distance (depth) along the camera axis, f is the focal length in pixels, b is a baseline in meters, and d is the disparity in pixels.

At least a portion of FIGS. 5, 8, 9, 16, and 20 include flow diagrams illustrating example algorithms or other processes according to some implementations. The processes are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation. Any number of the described blocks can be combined in any order and/or in parallel to implement the process, or alternative processes, and not all of the blocks need be executed. For discussion purposes, the processes are described with reference to the environments, frameworks, and systems described in the examples herein, although the processes may be implemented in a wide variety of other environments, frameworks, and systems.

Figure 5:
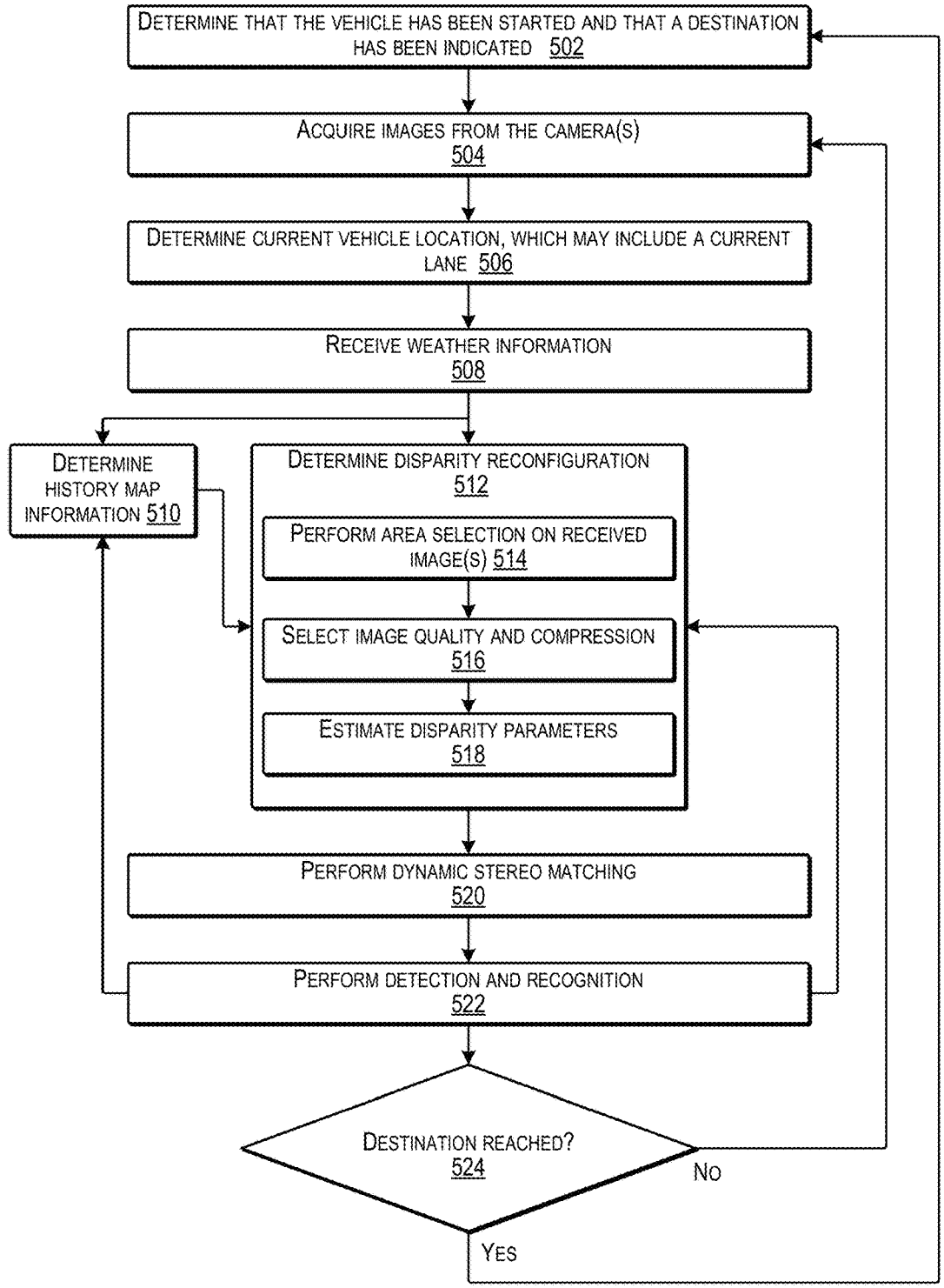
FIG. 5 is a flow diagram illustrating an example process for generating dynamically reconfigured disparity maps according to some implementations.

FIG. 5 is a flow diagram illustrating an example process 500 for generating dynamically reconfigured disparity maps according to some implementations. In some examples, the process 500 may be executed by the systems 100, 200, and/or 300 discussed above by execution of the recognition program 128. For example, the disparity reconfiguration techniques herein may include determining priority areas in an image using data-driven history map information. Furthermore, the system may select pixel bit-depths and image compression algorithms to use for the various different regions in an image being processed. Furthermore, the system may determine a disparity search range using disparity map and edge information, and then may apply dynamic stereo matching techniques to generate a disparity map for each area identified in the image.

As one example, after the engine is started and a destination has been determined, the recognition program may be executed to start capturing the right and left camera images. Using the current location of the vehicle along with the destination information, a history map may be generated to determine the higher priority areas in the captured images. In some examples, the higher priority areas may also be determined based on road anomaly information received from a road anomaly database. Based on the identified higher priority areas and current weather information, the system may determine an optimal image quality (bit-depth) for each pixel, and an optimal image compression algorithm to employ for each region of the image. Further, the system may determine a disparity search range and may perform stereo matching to create a disparity map in which areas of higher density disparity information have been dynamically determined based at least in part on the history map and/or road anomaly information. Recognition may be performed based at least in part on the generated disparity map, and additional disparity maps may be generated repeatedly until the vehicle reaches the destination. An example flow diagram of this process is set forth in FIG. 5.

At 502, the system may determine that the vehicle has started and that a destination has been indicated.

At 504, the system may begin acquiring images from the camera(s). In some examples, the camera may be a stereo camera while in other examples, the camera may be one or more mono cameras.

At 506, the system may determine current vehicle location, which may include a current lane. For example, the system may access a GPS receiver or other location indication information to determine the current location of the vehicle.

At 508, the system may receive weather information. For example, the system may receive the weather information over a network or may receive it from a local sensor onboard the vehicle.

At 510, the system may determine history map information. An example of determining history map information is discussed below with respect to FIG. 6.

At 512, the system may determine disparity reconfiguration by performing blocks 514, 516 and 518.

At 514, the system may perform area selection on the received image(s). An example algorithm for performing area selection is discussed below, e.g., with respect to FIGS. 6-8.

At 516, the system may select image quality and compression parameters. For example, as discussed below e.g., with respect to FIGS. 9-11, the system may determine an image quality and a compression level/method to use for various different areas of the image based on the area selection.

At 518, the system may estimate disparity parameters to use for generating the disparity map. For example, the system may determine an optimal search range for generating the disparity information, such as using the techniques discussed below with respect to FIGS. 15-19.

At 520, the system may perform dynamic stereo block matching on the received images to generate a disparity map or disparity image based on the estimated disparity parameters. Some areas of the disparity map are generated with higher density disparity information and remaining areas of the disparity map may be generated with lower density disparity information.

At 522, the system may perform detection and recognition using the generated disparity map.

At 524, the system may determine whether the destination has been reached. If not, the process may return to 504 to receive the next pair of stereo images from the camera. If so, the process may return to 502 to wait until a new destination has been indicated.

Figure 6:
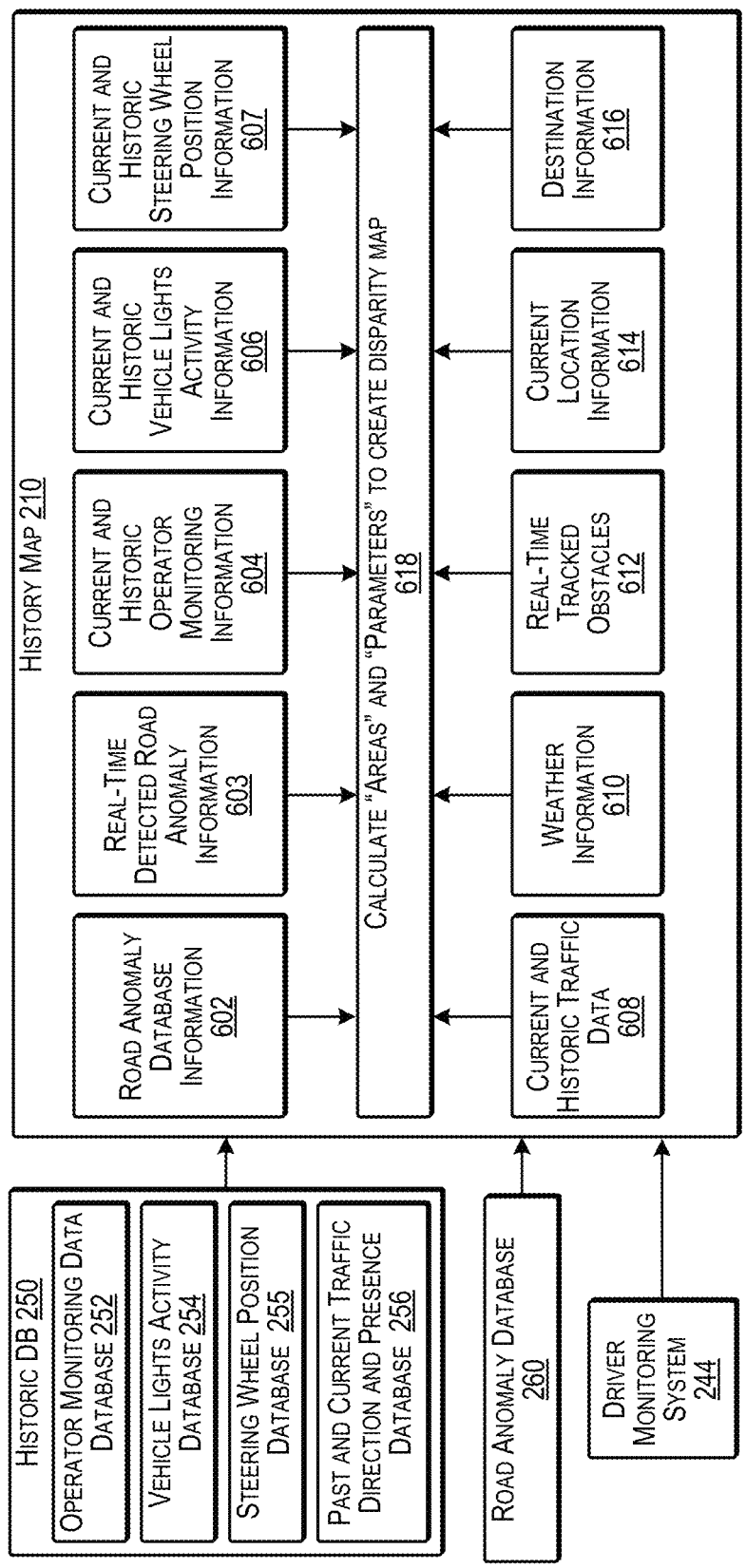
FIG. 6 illustrates an example of generating a history map according to some implementations.

FIG. 6 illustrates an example of generating a history map 210 according to some implementations. In some cases, obstacle and/or road anomaly detection may be used to determine which areas of an image to select for higher density disparity processing. However, several problems with just using obstacle and road anomaly detection include that obstacles and road anomalies are not the only reasons for desiring to have higher disparity areas generated. For example, if the vehicle is approaching a highway exit ramp or on-ramp, it may be desirable to have dense disparity information available for these regions of interest. As another example, if only detected obstacles are used for determining high density areas in heavy traffic situations, this may end up causing a dense disparity map to be generated for virtually the entire image, which may substantially increase the processing load on the processors. Accordingly, rather than just relying on obstacle and road anomaly detection, implementations herein may employ the history map 210 for determining higher priority areas to select in an image for generating higher density disparity information.

In the example of FIG. 6, the history map 210 may be generated at least in part based on information received from the historic database 250 discussed above with respect to FIGS. 2 and 3. For instance, as mentioned above, the historic database 250 may be generated from information collected from a plurality of vehicles that have traveled on the same road as that on which the vehicle is currently traveling. In this example, the historic database 250 includes the operator monitoring data database 252, the vehicle lights activity database 254, the steering wheel position database 255, and the past and current traffic direction and presence database 256. For example, the operator monitoring data database 252 may include areas of the road at which other operators may be looking at any particular point in time while traveling on the road.

The vehicle lights activity database 254 may indicate whether other operators used the brakes and/or used the turn signal while operating a vehicle on the road. The steering wheel position database 255 may indicate whether other operators turned the steering wheel at particular location while operating their vehicles on a road. In addition, real-time operator actions may also be monitored and used for decision making. For example, steering wheel movement of the steering wheel and/or vehicle lights activity of the ego vehicle may be monitored and also received as real-time inputs. The past and current traffic direction and presence database 256 may indicate traffic patterns, traffic flow, traffic congestion, or the like, encountered by other operators while traveling on the road, as well as current traffic positions. In addition, the road anomaly database 260 may indicate any road anomalies that have been detected by the plurality of vehicles in the past on the road on which the vehicle 102 is currently traveling. Examples of road anomalies may include potholes, speed bumps, other bumps, other types of irregular surfaces and so forth. In addition, any currently detected obstacles and currently detected road anomalies may be tracked in real time by the recognition program and taken into account.

In addition, when generating the history map 210, the recognition program may also be configured to take into account inputs received from the operator monitoring system on board the vehicle that may indicate current gaze or other real-time characteristics of the operator of the vehicle 102, as well as current steering wheel position information, current vehicle light activity information, and so forth. Accordingly, the recognition program 128 may take into consideration road anomaly database information 602, real-time detected road anomaly information 603, current and historic operator monitoring information 604, current and historic vehicle lights activity information 606, current and historic steering wheel position information 607, current and historic traffic data 608, weather information 610, real-time tracked obstacles 612, current location information 614, and destination information 616. By taking into account all this information, the recognition program 128 may calculate areas and parameters to use for creating a disparity map as indicated at 618.

Figure 7:
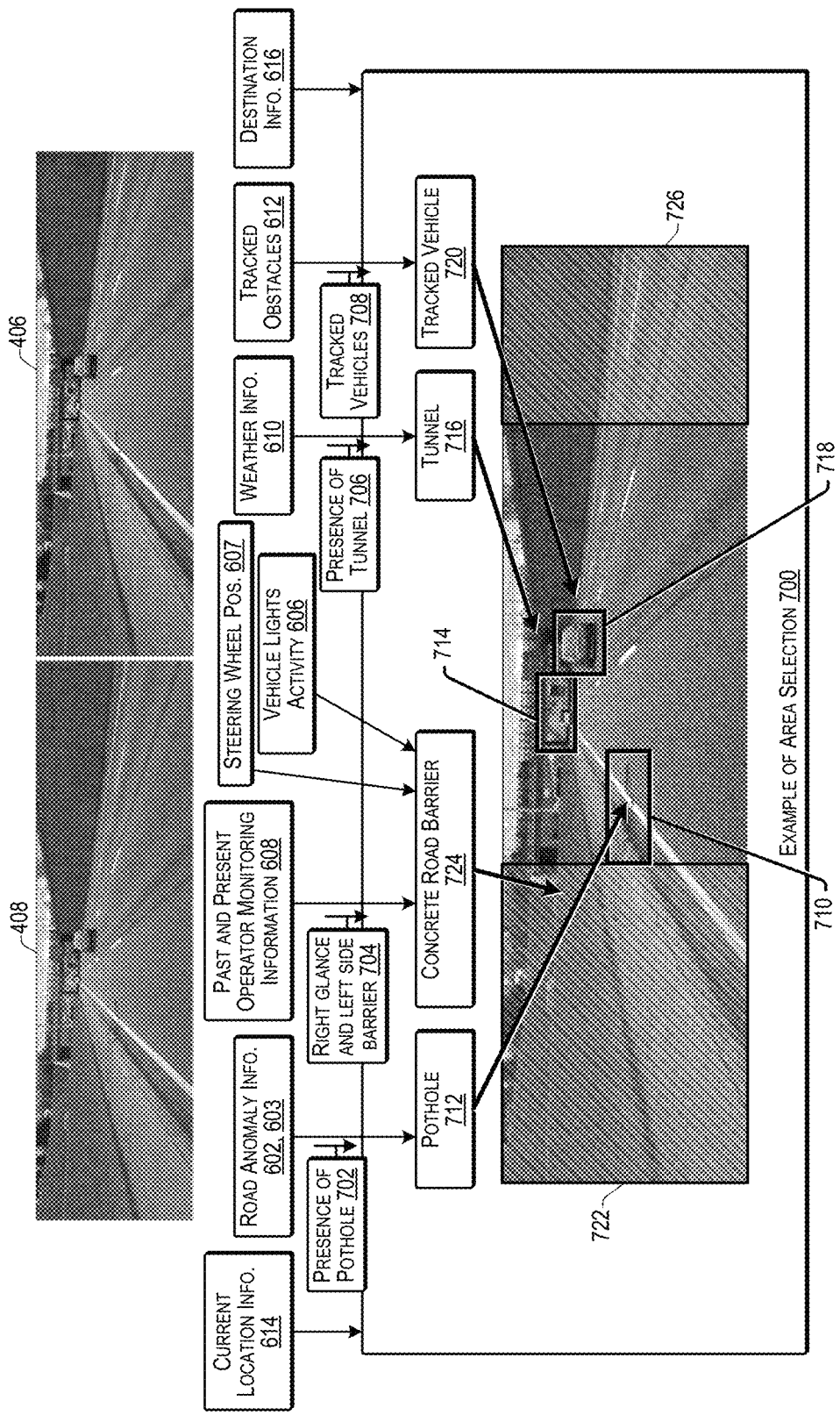
FIG. 7 illustrates an example of area selection based at least on the history map according to some implementations.

FIG. 7 illustrates an example of area selection 700 based at least on the history map according to some implementations. In this example, suppose that the left image 408 and the right image 406 discussed above with respect to FIG. 4 are received for processing. Further, the recognition program may receive as input the information from the history map 210 discussed above with respect to FIG. 6 for determining priority areas in at least one of the received images. For example, each database 252, 254, 255, 256 in the historic database 250 and the road anomaly database 260 contain lists of detected/recognized features with corresponding location information for each feature. Based on the current location of the vehicle, for each frame (i.e., each received image) contents of each database may be accessed for that location. For example, if there is a road anomaly that was indicated by the road anomaly database 260 and/or real-time road anomaly detection, then the distance of the road anomaly from current vehicle location may be determined. For instance, the dimensions of the road anomaly may also be determined from the road anomaly database and/or recognition information, along with a priority. The distance and dimension information may be converted to image coordinates. The area corresponding to the road anomaly may be labeled according to a priority level value, such as is discussed additionally below with respect to FIG. 8.

In the illustrated example, the history map information may include current location information 614, road anomaly information 602 and 603, past and present operator monitoring information 608, vehicle lights activity 606, steering wheel position information 607, weather information 610, tracked obstacles 612, and destination information 616. Thus, the history map information may indicate the presence of a pothole as indicated at 702, a right glance and left-side barrier as indicated at 704, the presence of a tunnel as indicated at 706, and one or more tracked vehicles 708. Based on this information, the recognition program may configure the system to select several areas of higher priority in at least one of the images. Accordingly, the system may select an area 710 corresponding to a pothole 712 as a higher priority area. Further, the system may select an area 714 corresponding to a tunnel 716 as a higher priority area. In addition, the system may select an area 718 corresponding to a tracked vehicle 720 as another higher priority area. Furthermore, the system may select a left side area 722 corresponding to a concrete road barrier 724 as a lower priority area (indicated by crosshatching) and settling may select a right side area 726 as another lower priority area (also indicated by crosshatching). The remaining, non-selected area of the image may also be designated a lower priority area. Additionally, while the shapes of the priority areas 710, 714, and 718 are indicated as rectangles in this example, implementations herein are not limited to any particular shape for the priority areas.

Figure 8:
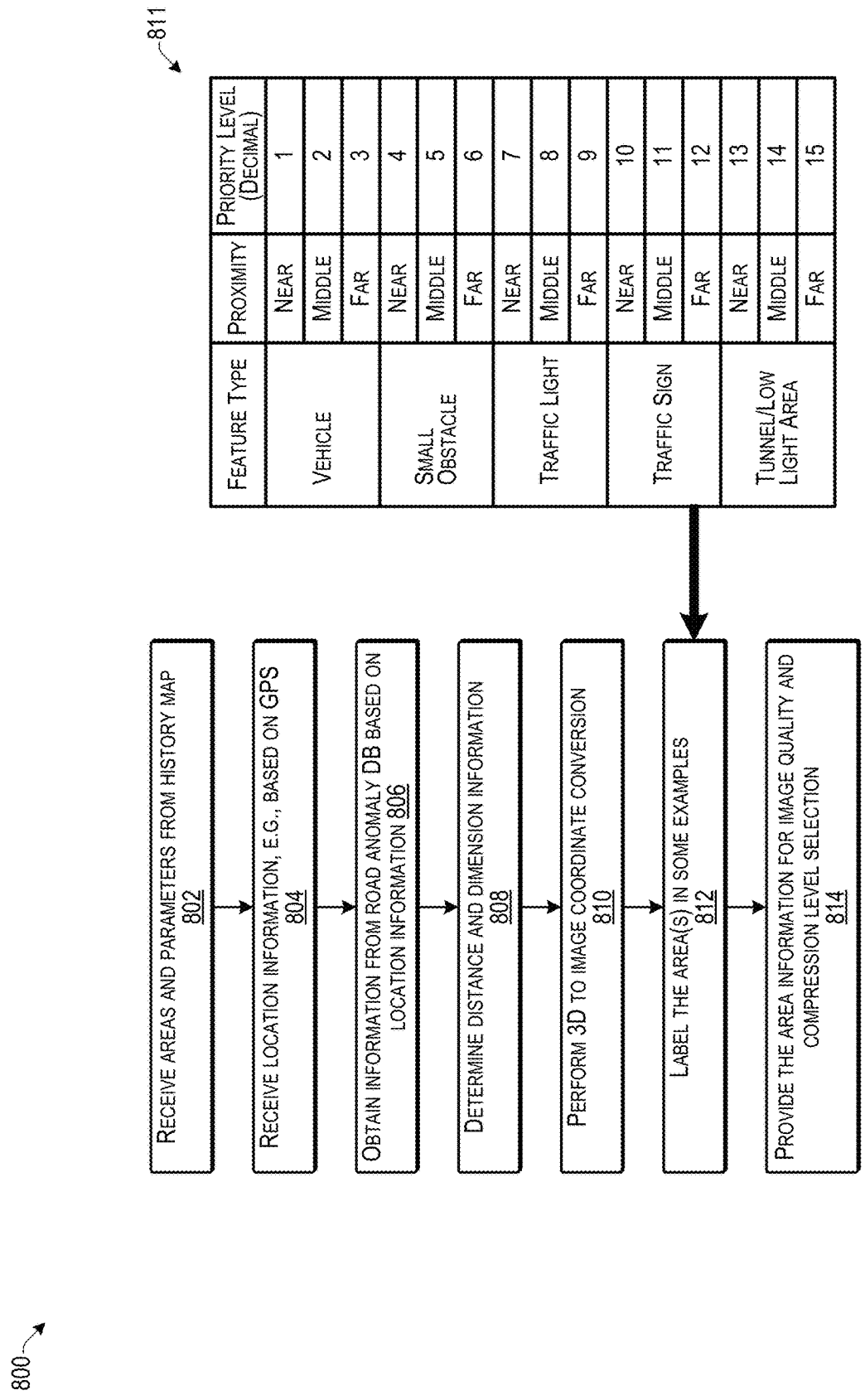
FIG. 8 includes a flow diagram illustrating an example process for determining selected areas according to some implementations.

FIG. 8 includes a flow diagram illustrating an example process 800 for determining selected areas according to some implementations. In some examples, the process 800 may be executed by the systems 100, 200, and/or 300 discussed above, such as by execution of the recognition program 128. In some cases, the process 800 may correspond in part to block 14 of FIG. 5 discussed above.

At 802, the system may receive areas, indications of features, and other parameters from the history map.

At 804, the system may receive location information indicating a current location of the vehicle such as based on information received from the GPS receiver.

At 806, the system may obtain information from the road anomaly database based on the location information.

At 808, the system may determine distance and dimension information for various features identified in the history map and road anomaly information.

At 810, the system may perform 3D to image coordinate conversion to determine distances from the vehicle to the various identified features in the image.

At 812, the system may label the areas corresponding to identified features. For instance, in some examples the system may optionally label each of the areas such as with a feature type or the like. To perform the labeling, the system may refer to a priority level table 811 that may indicate the feature type, such as vehicle, small obstacle, traffic lights, traffic sign, a tunnel/lowlight area, or the like. The table 811 may further indicate a proximity of the respective feature, e.g., near, middle, or far, and a corresponding priority level in decimal value for each feature and proximity, e.g., 1-15.

At 814, the system may provide the area information to the next algorithm for performing image quality and compression selection, as discussed additionally below.

Figure 9:
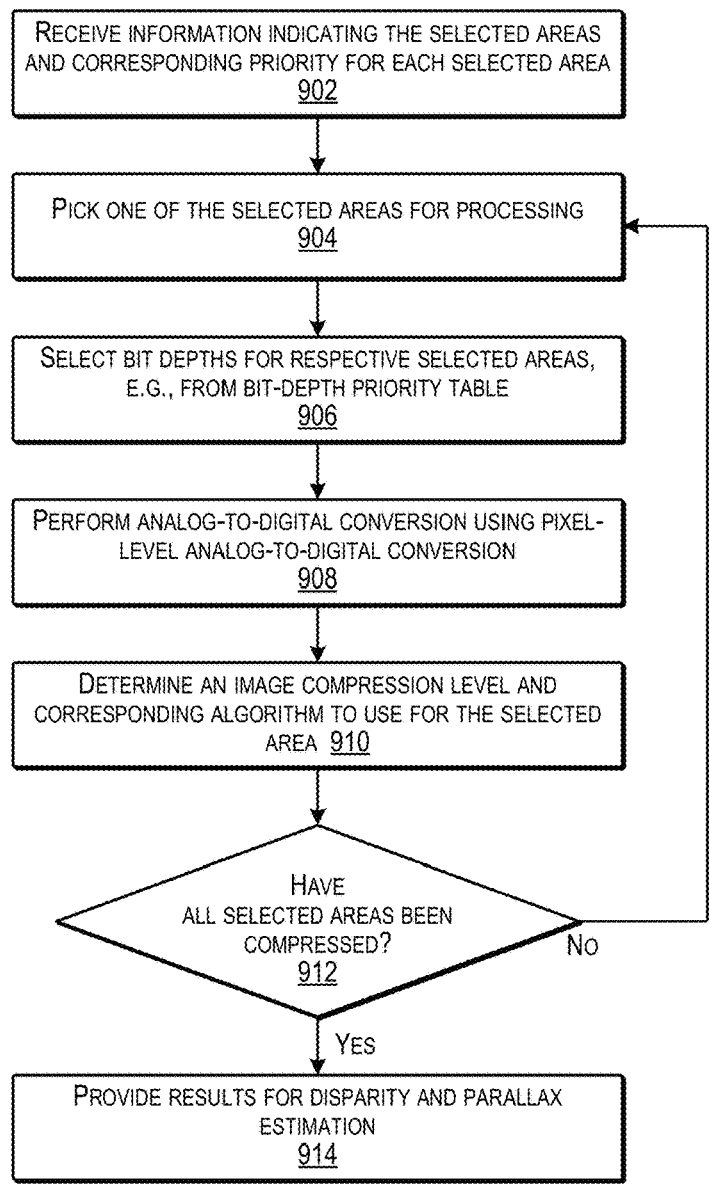
FIG. 9 is a flow diagram illustrating an example process for determining bit depths and compression levels according to some implementations.

FIG. 9 is a flow diagram illustrating an example process 900 for determining bit depths and compression levels according to some implementations. In some examples, the process 900 may be executed by the systems 100, 200, and/or 300 discussed above by execution of the recognition program 128. For instance, after the priority areas are selected, the system may determine an optimal bit-depth and corresponding image compression level for each selected priority area. In particular, in a camera system, an image sensor such as a charge-coupled device (CCD) or the active-pixel sensor (CMOS) may receive light through a lens or other optics. The sensor may transfer information related to the received light to the next stage as either a voltage signal or a digital signal. For instance, a CMOS sensor may convert photons into electrons, then to a voltage, and then to a digital value using an analog-to-digital converter (ADC). The digital value may be stored with a designated bit-depth.

Conventionally, a pixel bit-depth in ADC may be predefined (i.e., constant). For example, either a higher bit-depth (e.g., 16-bits) may be selected for the entire image, or in some cases a lower bit-depth (e.g., 8-bit) may be selected for the entire image. Lower bit-depth images may have lower memory requirements and may also yield lower density disparity maps. On the other hand, higher bit-depth images are able to be used to generate higher density disparity maps, but also require more memory for each image.

In addition, the images herein may be compressed. However, some compression algorithms may result in loss of information, which may be undesirable for higher priority areas. Accordingly, the system herein may determine an optimal compression level and corresponding compression algorithm to use for the individual selected areas based at least on an indicated priority level for each area. In some cases, a compression priority table may be used for determining the optimal compression algorithm for each selected area.

At 902, the system may receive information indicating the selected areas and corresponding priority for each selected area determined, e.g., based on the process 800 of FIG. 8.

At 904, the system may select one of the selected areas to process.

At 906, the system may determine a bit depth to use for the selected area being processed, e.g., by referring to a bit-depth priority table. An example bit-depth priority table is discussed below with respect to FIG. 10.

At 908, the system may perform analog-to-digital conversion using pixel-level analog-to-digital conversion for the selected area. An example is discussed below, e.g., with respect to FIG. 11.

At 910, the system may determine an image compression level and corresponding compression algorithm to use for the selected area, and may perform compression of the selected area.

At 912, the system may determine whether all selected areas have been compressed? If so, the process goes to 912. If not, the process returns to 904 to pick a next selected area for processing.

At 914, when all of the areas of the image have been compressed, the compressed image may be provided to the disparity and parallax estimation algorithm discussed additionally below, e.g., with respect to FIGS. 15-22.

FIG. 10 illustrates an example bit-depth priority table 1000 according to some implementations. For instance, the system may select a bit depth for each pixel using the selected areas and the bit-depth priority table 1000. In this example, the bit-depth priority table 1000 contains information that indicates the bit depth for each selected area depending on the type of the feature and the distance of the feature from the vehicle 102, such as based on one or more current scenarios. For example, in shadow or low light scenarios (e.g., a tunnel), it may be very difficult to generate an accurate disparity map using a low pixel bit-depth, such as 8-bit, since only less range of shades are available for performing the disparity estimation. To counter this, additional range of shades by high-pixel-bit-depth (10 to 12-bit) images may make it possible to correct deep shadows and/or highlights for generating an accurate disparity map.

Similarly, for features that are in the distance (i.e., the far region), such as small obstacles, a higher pixel bit-depth, such as 10-12 bits, may be used. Further, while the examples, herein describe using bit-depths of 8-bits, 10-bits, and 12-bits, implementations herein are not limited to any particular values for the bit depths, and any of various bit depth values may be applied to other pixel bit-depth setups. For example, the pixel bit-depth may be changed based on ECU capability, such as to increase the disparity accuracy and to use available resources efficiently. In the example of FIG. 10, the bit depth priority table includes a feature type 1002 and a feature location 1004, such as far 1006, middle 1008, and near 1010.

Figure 11:
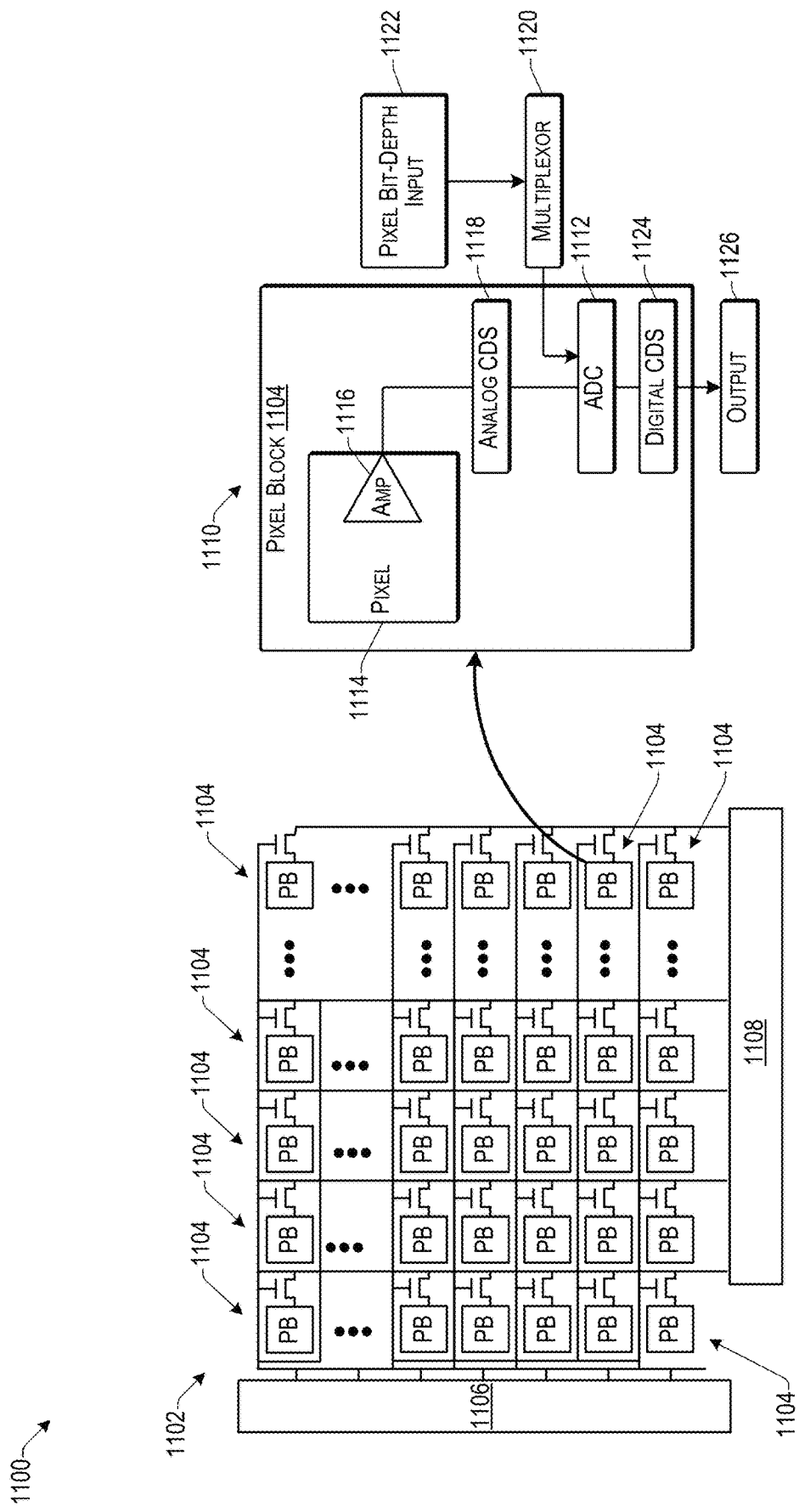
FIG. 11 illustrates an example of pixel-level analog-to-digital conversion according to some implementations

FIG. 11 illustrates an example 1100 of pixel-level analog-to-digital conversion according to some implementations. Some examples herein may employ an image sensor 1102 having pixel-level analog-to-digital converters (ADCs). The image sensor 1102 includes a plurality of pixel blocks (PBs) 1104 arranged in rows and columns, and in communication with a row selector 1106 and a column selector 1108.

As illustrated at 1110 in an enlarged example of one of the pixel blocks 1104, each pixel block 1104 in the image sensor 1102 contains its own ADC 1112 to convert an analog signal value (e.g., voltage) to a digital signal value. For example, a pixel 1114 in the pixel block 1104 may receive light and an amplifier 1116 associated with the pixel 1114 may amplify an electrical signal generated based on the received light. An analog correlated double sampling (CDS) circuit 1118 may sample the signal twice to reduce noise, and passes the signal to the ADC 1112.

The bit-depth in each ADC 1112 for each pixel 1114 may be controlled by a multiplexor 1120 based on a received pixel bit-depth input 1122. For example, as discussed with respect to FIGS. 9 and 10, the recognition program 128 may determine a priority level for each pixel in each area of the image sensor, and based on the bit depth priority table 1000 discussed above with respect to FIG. 10, may dynamically set the bit depth for each pixel block 1104 in the in the image sensor 1002. Accordingly, for an area of the image sensor corresponding to an area of an image for which a priority level has been determined, the bit depth may be set so that the next image taken has the specified pixel level bit depth for each pixel. For instance, not only the bit depth of grayscale, but also color channels may be specified dynamically such as based on feature type, distance, and location.

The use of a lower bit depth for lower priority areas of an image and higher bit depth for higher priority areas of the same image enables the lower priority areas and thereby the entire image to consume less memory, while the higher priority areas still have a greater amount of image information for generating higher density disparity information. Following analog to digital conversion in the ADC 1112, the signal may pass to a digital CDS 1124 and then output to memory. After the values of all pixel blocks 1104 have been converted to digital values, the image is stored in memory and suitable image compression may be applied to the image based on the selected priority areas, as discussed additionally below.

Figure 12:
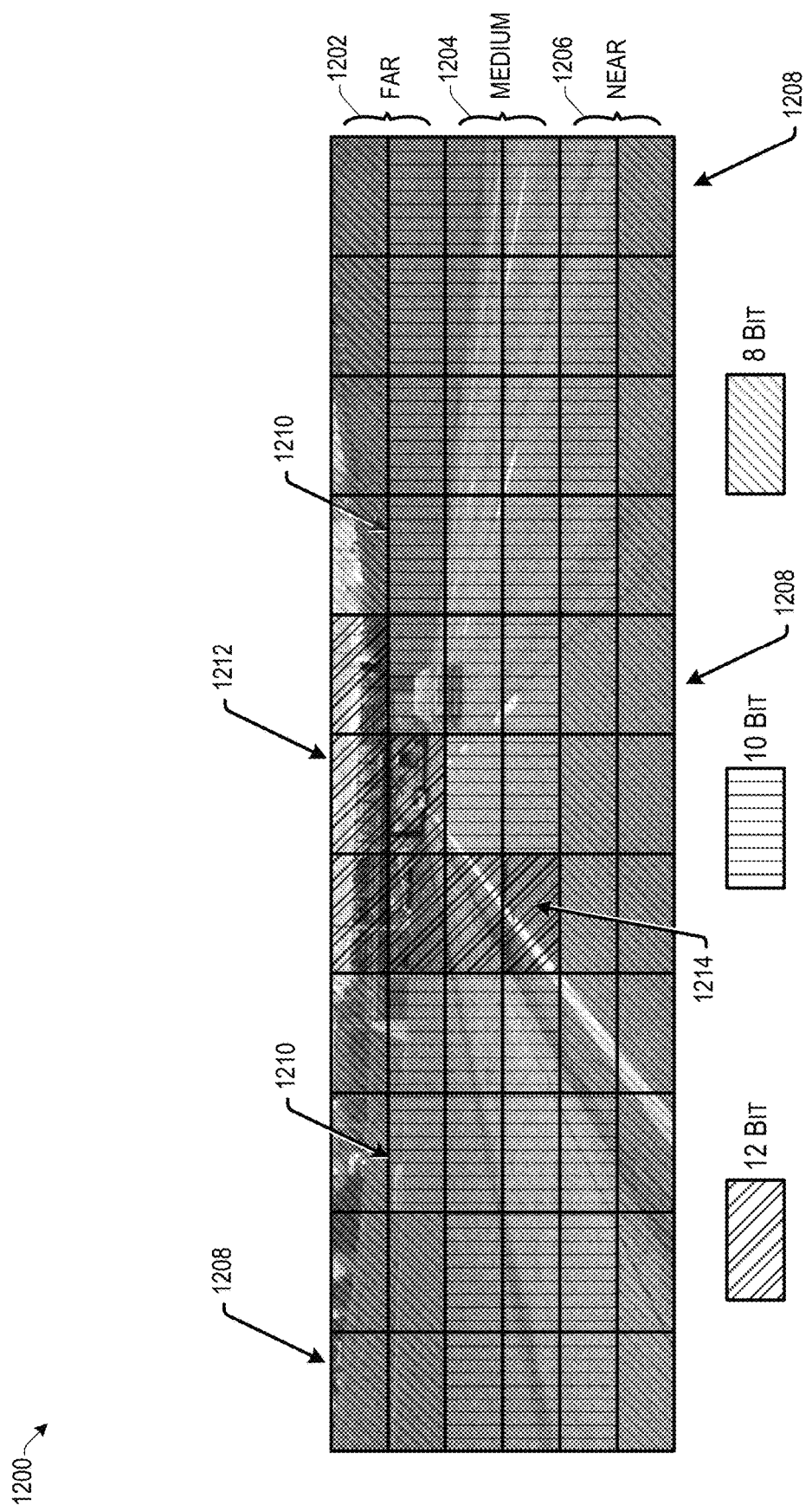
FIG. 12 illustrates an example image having varied bit depth for areas of different assigned priorities according to some implementations.

FIG. 12 illustrate an example image 1200 having varied bit depth for areas of different assigned priorities according to some implementations. In this example, suppose that lower priority areas are assigned a bit depth of 8 bits, intermediate priority areas are assigned a bit depth of 10 bits, and higher priority areas are assigned a bit depth of 12 bits. Furthermore, the image includes an indication of assigned distances, namely, far 1202, medium 1204, and near 1206. Accordingly, as indicated at 1208, lower priority areas of the image are provided with a bit depth of 8 bits, as indicated by a first crosshatching style. Further, as indicated at 1210, intermediate priority areas of the image 1200 are provided with a bit depth of 10 bits, as indicated by a second that crosshatching style. Additionally, as indicated at 1212, higher priority areas of the image 1200 are provided with a bit depth of 12 bits, as indicated by a third crosshatching style.

For instance, the pothole 1214 previously identified as being associated with a higher priority area is included in a portion of the image 1200 generated with a bit depth of 12 bits. Furthermore, while eight, 10, and 12 bits are used as the relative bit depth in this example, in other examples, higher or lower bit depths may be used for the various different levels of priority. Accordingly, implementations herein are not limited to any particular bit depth for any particular level of priority.

FIG. 13 illustrates an example compression priority table 1300 according to some implementations. For instance, the compression priority table 1300 may include a feature type 1302 and feature location 1304, which may include far 1306, middle 1308, and near 1310. Each distance level, far 1306, middle 1308, and near 1310, may include a priority level 1312 and a corresponding image compression quality level 1314.

Examples of features may include a vehicle, small obstacle, traffic light, traffic sign, and/or tunnel or other lowlight area. For example, portions of an image with features that are farther away and therefore more difficult to detect may be compressed using a low lossy or lossless compression algorithm, while portions of the image with features that are closer and therefore easier to detect in the image may be compressed include a medium lossy or a lossy compression algorithm, such as based upon the feature type and distance.

Examples of compression algorithms are indicated at 1316. For example, a lossless compression algorithm may be a PNG (Portable Network Graphics) lossless algorithm, while varying levels of the JPEG (Joint Photographic Experts Group) compression algorithm may be used for providing low lossy, medium lossy, or lossy compression levels. Furthermore, while several example compression algorithms are discussed herein imitations herein are not limited to any particular compression algorithm.

Figure 14:
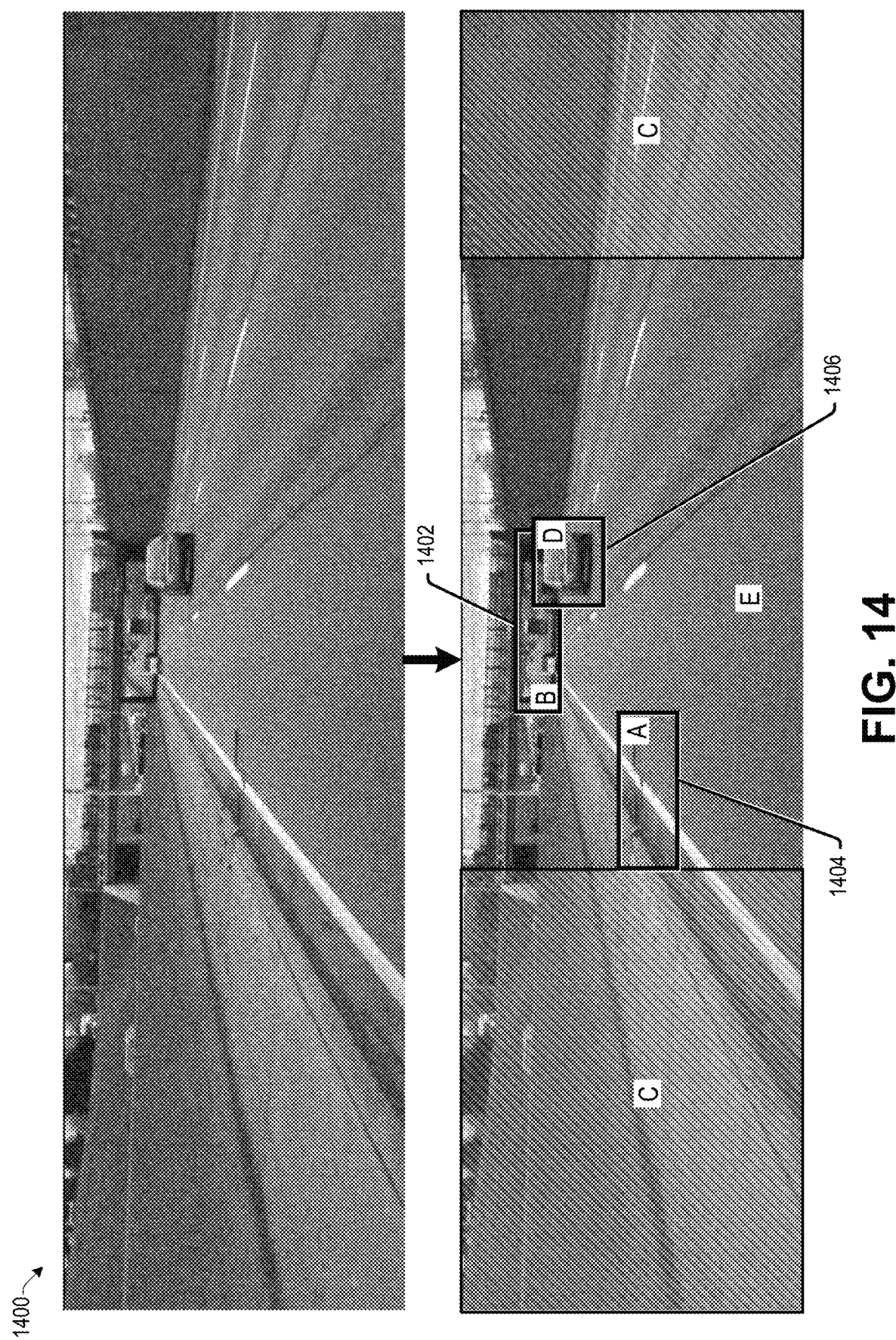
FIG. 14 illustrates an example image with different regions selected for compression using different compression levels according to some implementations.

FIG. 14 illustrates an example image 1400 with different regions selected for compression using different compression levels according to some implementations. Once an image is generated, image compression may be applied to make the image easier to store and transmit. For instance, image compression reduces the size of the data with a controllable effect on image quality, depending on the level of compression selected. As one example, in a color space transformation, one-color input may be decomposed into red, green, and blue components or YCbCr (Luminance, chrominance blue, chrominance red) components and stored separately. A mapper may transform pixel values of an input image to interpixel coefficients. Quantization may be used to reduce the number of possible values of a quantity, thereby reducing the number of bits needed to represent the quantity. Additionally, entropy encoding may be used to represent the quantized coefficients as compactly as possible.

In some examples herein, an image compression algorithm and compression level may be selected using the compression priority table 1300 discussed above. For instance, the compression priority table 1300 may indicate a compression algorithm and compression level to use for compressing an image based on a feature type, the distance of the feature from the vehicle, and current traffic scenarios.

The image compression rate may have some effect on the image and the color quality of the image, which in turn may affects the accuracy of the disparity map. For instance, a detected feature located in a far region may have very few pixels that can be used to calculate the disparity map very accurately. Accordingly, if lossy image compression were to be used to reduce the memory storage, the image quality and subsequent disparity information may also be affected. For instance, as indicated at 1402, a vehicle in the far region may be diffused or blend in with the background which may result in an inaccurate disparity map. On the other hand, implementations herein may employ a lossless image compression for such areas of the image 1400, while a high compression rate may be used for larger features in the near distance region and for portions of the image with no features of interest. Accordingly, based on the compression priority table suitable image compressions levels may be selected to increase the system performance without increasing storage memory.

In the example of FIG. 14, as mentioned above, low lossy or lossless compression may be used for the selected area B indicated at 1402, and may also be used for the selected area A indicated at 1404 that includes the pothole. Further, a medium lossy compression level may be used for the selected area D indicated at 1406 that includes another vehicle. A lossy high compression level may be used for the remainder of the image including areas E and C.

Figure 15:
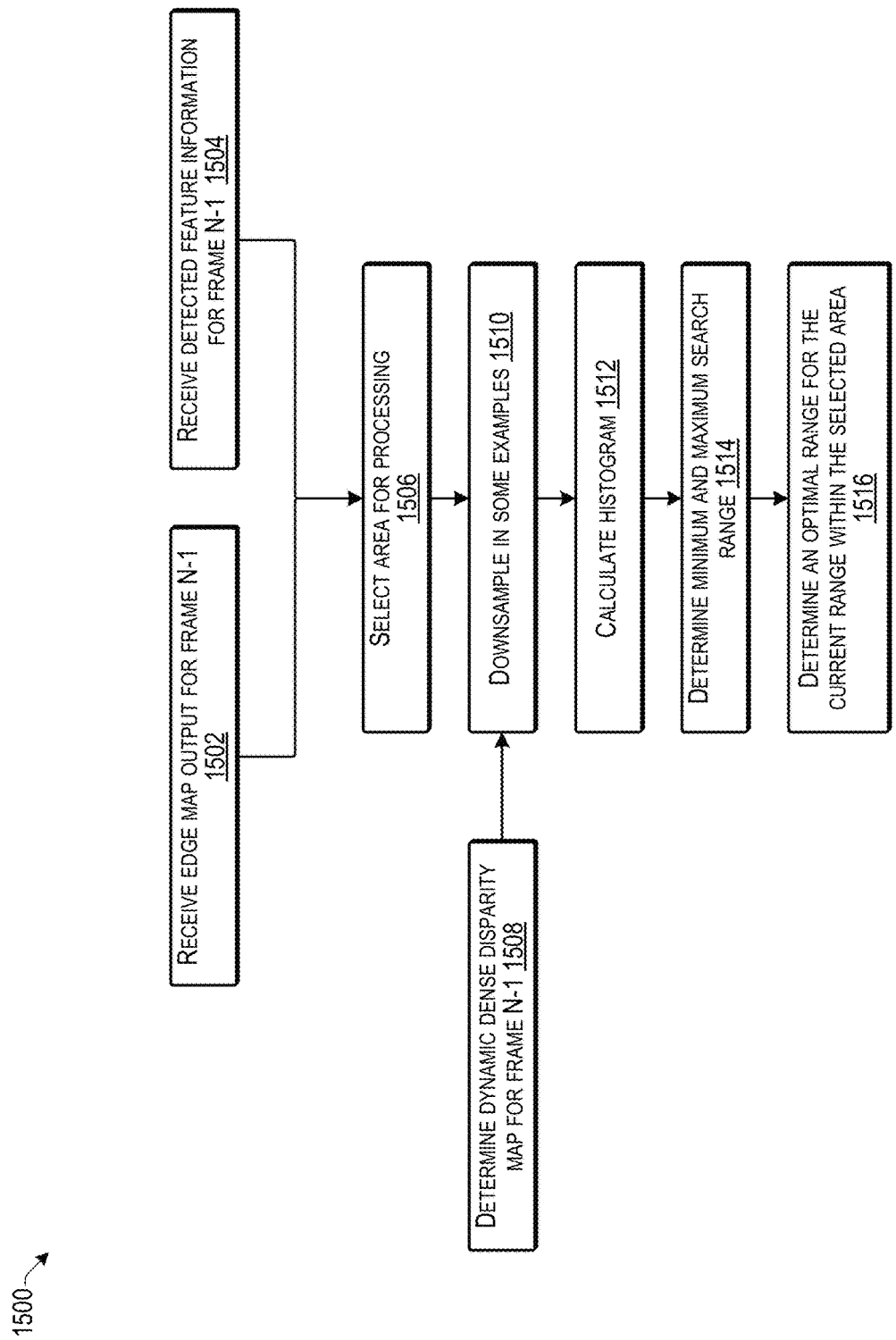
FIG. 15 is a flow diagram illustrating an example process for determining an optimal search range according to some implementations.

FIG. 15 is a flow diagram illustrating an example process 1500 for determining an optimal search range according to some implementations. After an image is compressed, disparity parameters may be determined for generating a disparity map. Disparity information may be determined using either global or local methods. One example of a local method includes block matching, in which the processor searches one image of a pair of images for the best corresponding region for a template in the other image of the pair. The template may be sequentially shifted along an epipolar line (i.e., a scan line) in a specified disparity search range.

Disparity search range is a parameter that can affect both disparity accuracy and processing load. Traditionally, the disparity search range may be fixed for the whole image or a pre-defined region, and may be constant irrespective of traffic scenarios, detected features, or the like. For example, a predefined disparity search may yield accurate disparity information for near and medium range features; however, in the far region, the accuracy may decrease and the search process may fail to find a good block match.

To provide a solution to the above issues, some examples herein may employ a dynamic optimal search range in which the search range is determined dynamically for each selected area using dense disparity map and edge map information determined from a previous frame image. This technique not only achieves reduced processing time, but also frees up more resources that may be used, e.g., for disparity estimation. In some examples, the process 1500 may be executed by the systems 100, 200, and/or 300 discussed above, such as by execution of the recognition program 128, and may correspond to block 518 of FIG. 5.

At 1502, the system may receive edge map output for an image that preceded the image currently being processed (e.g., frame N−1). For example, the prior frame may have preceded the current image within a threshold period of time.

At 1504 the system may receive detected feature information for the image that preceded the current image (e.g., frame N−1).

At 1506, the system may select an area in the preceding image for determining an optimal disparity search range.

At 1508, the system may access or otherwise determine dynamic dense disparity map information for the selected area in the image that preceded the current image (e.g., frame N−1).

At 1510, in some examples, the system may downsample the selected disparity map area.

At 1512, the system may calculate a histogram for the selected disparity area determined based on the edge map information, the detected feature information, and the dense disparity map information for the image that preceded the current image.

At 1514, the system may determine a minimum and maximum search range based on the histogram.

At 1516, the system may determine an optimal range for the selected area in the current image based on the minimum and maximum search range determined for the preceding image.

Figure 16:
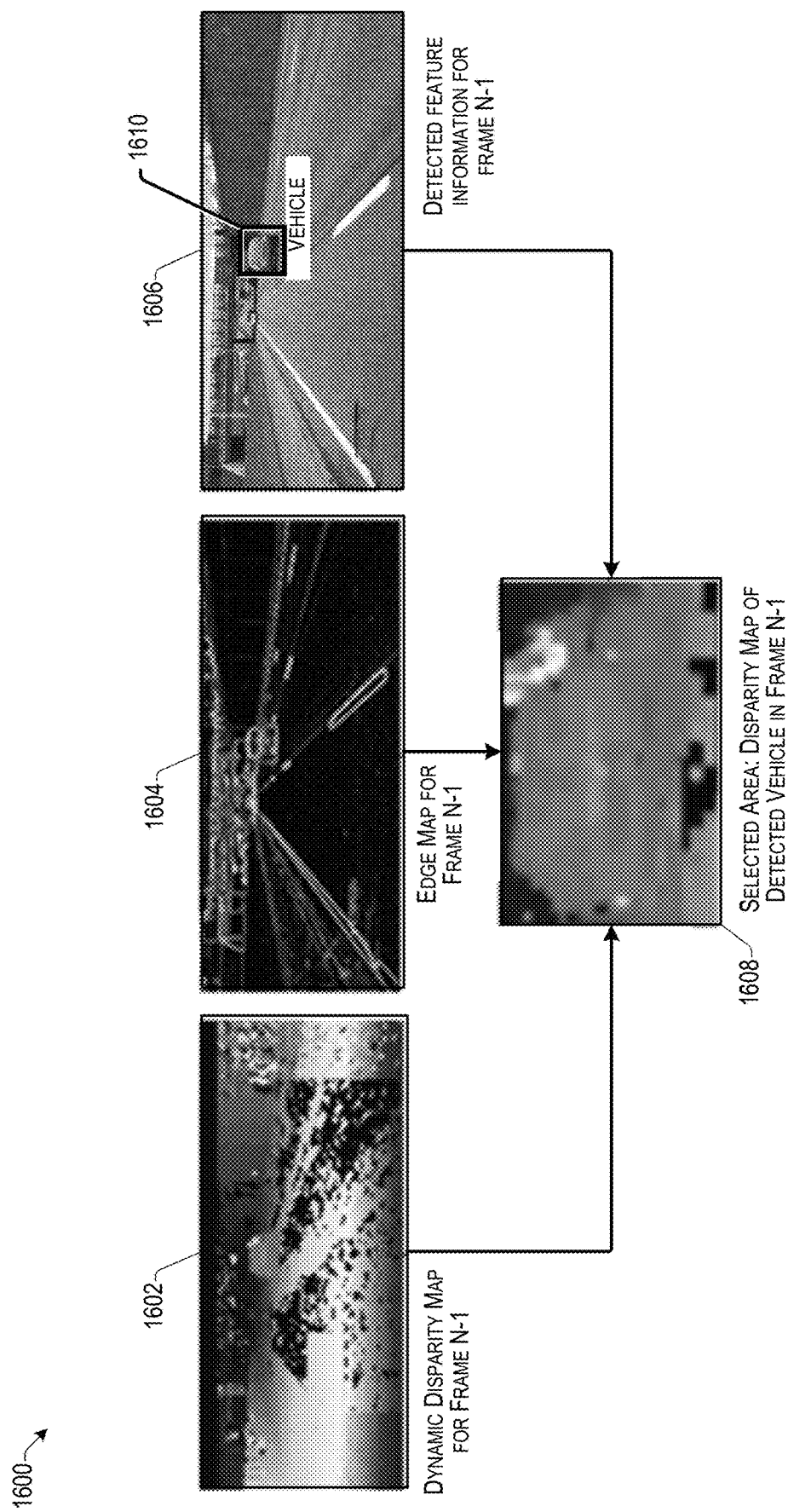
FIG. 16 illustrates an example of determining dynamic dense disparity information for a selected area of an image according to some implementations.

FIG. 16 illustrates an example 1600 of determining dynamic dense disparity information for a selected area of an image according to some implementations. For instance, FIG. 16 may correspond to at least blocks 1502-1508 of FIG. 15. In particular, a dynamic disparity map 1602 for the image of frame N−1, an edge map 1604 for frame N−1, and a detected feature information image 1606 for frame N−1 may be used for determining a disparity map of a detected vehicle in a selected area of the image of frame N−1, as indicated at 1608. For instance, the selected area may correspond to the area 1610 indicated in the image 1606 for frame N−1.

In some cases, for the frame N−1, a fixed disparity range may be selected for the whole image and a disparity map 1602 may be estimated. Then, a dynamic optimal search range estimation for the current image may be performed based on information about the previously detected features in the preceding image 1606, and further based on the edge map 1604 of the preceding image and the disparity map of the preceding image. For instance, the edge map 1604 may be used to refine the selected area to make the selected area very compact. Once the area is selected, the disparity map 1608 of the selected area may be down sampled in some cases, while in other cases, the disparity map 1608 may be passed to the next stage for generation of a histogram without downsampling. The decision as to whether to downsample may depend at least partially on the processing capability of the processor performing the operations.

Figure 17:
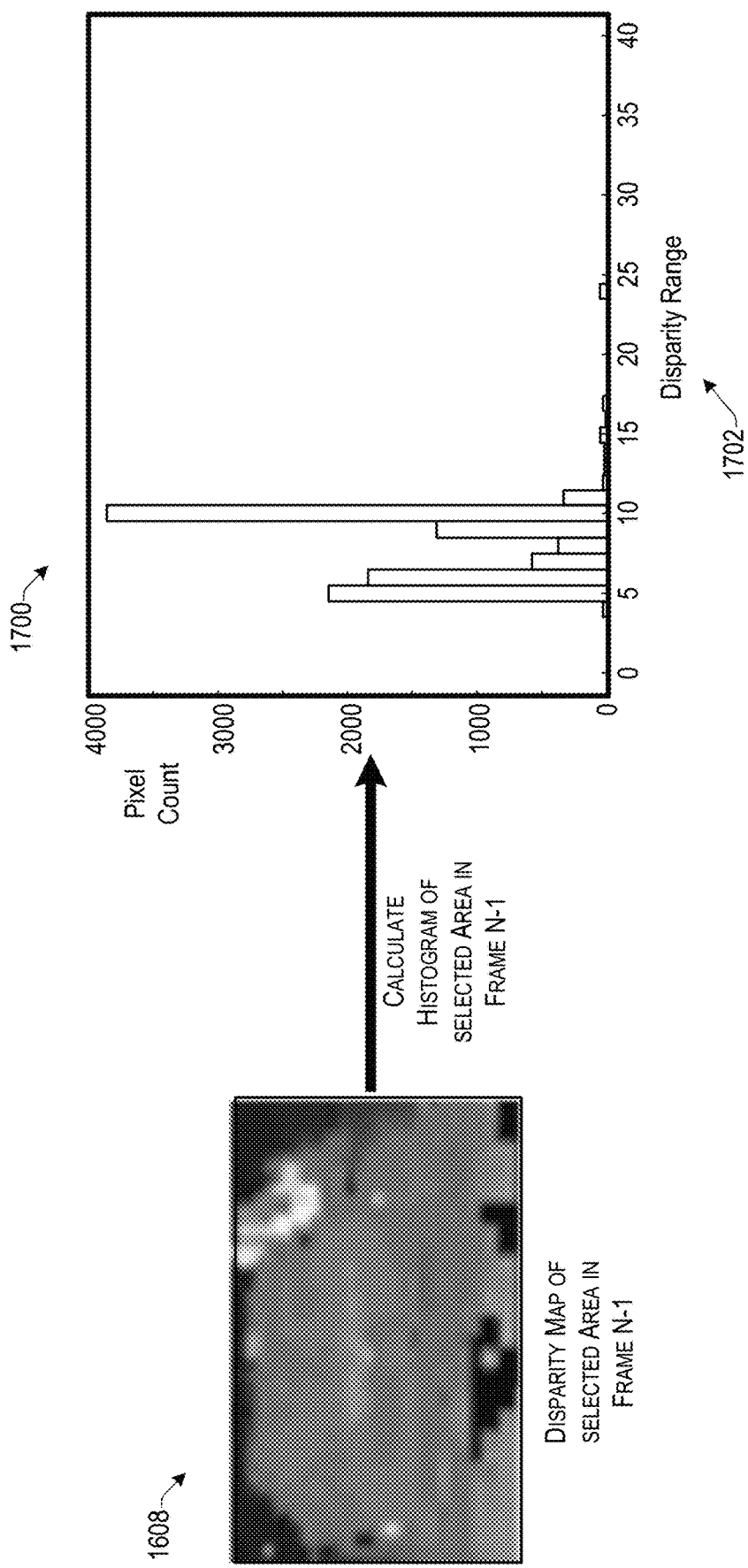
FIG. 17 illustrates an example of generating a histogram from the disparity map of the selected area of frame N−1 according to some implementations.

FIG. 17 illustrates an example of generating a histogram 1700 from the disparity map of the selected area of frame N−1 according to some implementations. For example, disparity map 1608 of the selected portion of the preceding image, such as determined in FIG. 16 above, may be used to generate the histogram 1700. The histogram 1700 may represent the number of pixels corresponding to each disparity (parallax) value in a disparity range 1702. The histogram 1700 may be used for determining an optimal search range to use for determining disparity information for a current image N that followed the preceding image N−1.

Figure 18:
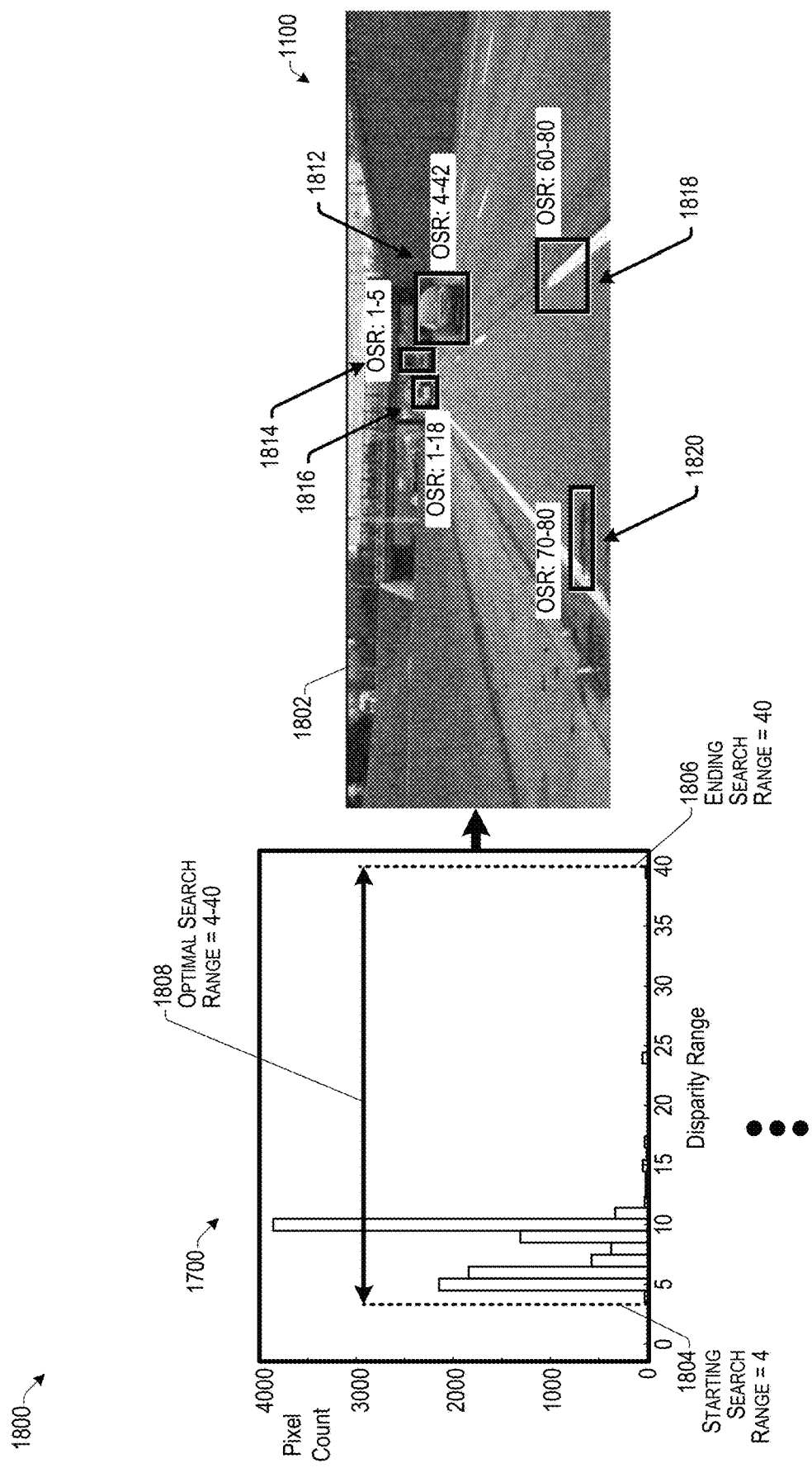
FIG. 18 illustrates an example of determining optimal search ranges for a plurality of areas according to some implementations.

FIG. 18 illustrates an example 1800 of determining optimal search ranges for a plurality of areas according to some implementations. For instance, a plurality of histograms 1700 may be generated, e.g., one histogram for each area of interest in a current image being processed. Once a histogram is generated, a maximum (ending) and a minimum (starting) range may be estimated and may be indicated to be an optimal search range (OSR) for the corresponding area of the current image 1802. In the example histogram 1700 a starting search range 1804 is determined to be 4 and an ending search range 1806 is indicated to be 40 based on the pixel count information in the histogram. Accordingly, the OSR 1808 determined from the histogram 1700 is 4-40, which is based on the frame N−1.

The OSR 1808 was determined with respect to the previous frame (N−1). Therefore, to estimate the OSR for the current frame (N), predicted feature information may be used. For instance, the ending search range may be decreased if the detected vehicle's relative speed is greater than zero, or may be increased if the detected vehicle's relative speed is less than zero. In this example, suppose that the detected vehicle's relative speed is less than zero, and thus, the OSR for the current frame is estimated to be 4-42, rather than 4-40. Then using the predicted area, OSR is estimated, which is as shown in FIG. 27. is used to calculate the disparity map for the current frame.

Similarly, for the rest of the areas of interest of the image OSRs may be estimated based on calculating additional histograms for the selected areas in the frame N−1. If the selected area (row*column=m×n) is greater than a predefined threshold value "Th", default "m×n" block is used (for example road region). For instance, m×n is selected based on ECU capability. Accordingly, in the image 1802, area 1812 is determined to have an OSR of 4-42, as mentioned above. Further, area 1814 has an OSR of 1-5; area 1816 has an OSR of 1-18; area 1818 has an OSR of 60-80; and area 1820 has an OSR of 70-80.

Figure 19:
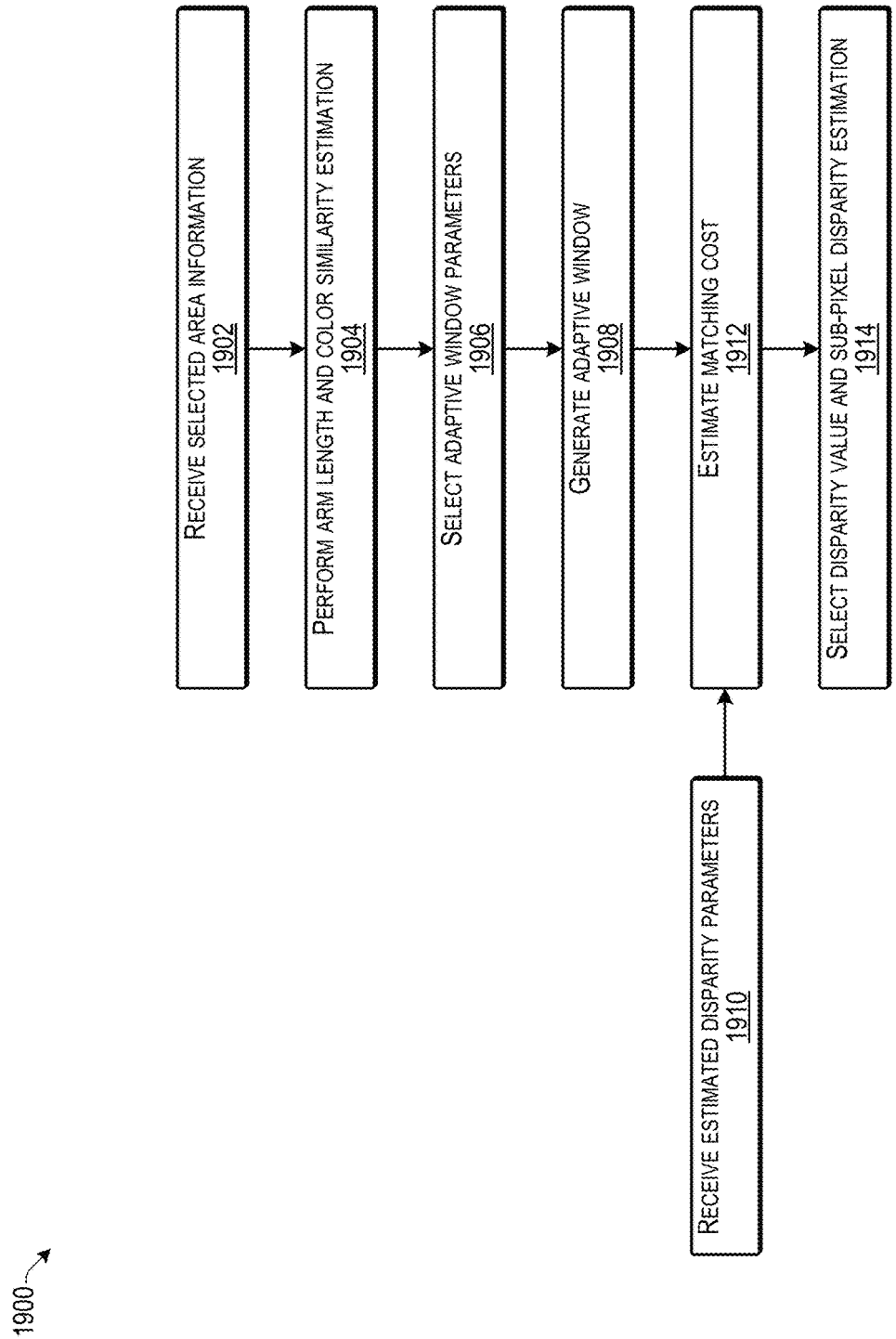
FIG. 19 is a flow diagram illustrating an example process for adaptive window based stereo matching according to some implementations.

FIG. 19 is a flow diagram illustrating an example process 1900 for adaptive window based stereo matching according to some implementations. In some examples, the process 1100 may be executed by the systems 100, 200, and/or 300 discussed above by execution of the recognition program 128.

Once the optimal disparity search range is estimated for the respective areas of interest in an image, then, to find a best match, different cost metrics may also be selected depending on the processing capability of vehicle computing device(s). As one example, determining a Sum of Absolute Difference (SAD) may require a relatively low processing time; however; the accuracy of the similarity measurement determined using this technique may also be low. Accordingly, some examples herein may employ a Zero-mean Sum of Absolute Difference (ZSAD), which is an improved technique for similarity matching, which may use more processing time than SAD, but which may provide a more accurate similarity measurement as compared to that of SAD.

Furthermore, the overall accuracy of the similarity measurement may also depend on the size of the matching window used. For instance, if the window size selected for block matching is too small, the process may result in a noisy disparity map. On the other hand, if the window size is too large, the resulting disparity map may be too smooth, such as with edges that are diffused with the background, which provides little useful information.

To overcome the above issues, some examples herein include a novel adaptive-window-based ZSAD stereo matching (disparity map) technique. For instance, initially, a color similarity threshold and an arm length threshold may be selected, where the arm length threshold may play a role based on the priority of the selected area. Using the above parameters, an adaptive window may be generated for the right and left images individually. Then using the estimated OSR range for each area, the ZSAD value may be calculated. Once the ZSAD is calculated over the complete disparity optimal search range (OSR), a minimum value may be calculated and may be used as the low-resolution disparity value. Then the sub-pixel disparity may also be estimated in some cases, depending on the desired resolution.

At 1902, the system may receive selected area information regarding the areas of interest previously selected in the image being processed.

At 1904, the system may perform arm length and color similarity estimation based on the arm length threshold and the color similarity threshold, respectively.

At 1906, the system may select adaptive window parameters for the selected areas.

At 1908, the system may generate an adaptive window.

At 1910, the system may receive estimated disparity parameters.

At 1912, the system may estimate a matching cost.

At 1914, the system may select a disparity value, in some examples, a sub-pixel disparity estimation.

Figure 20:
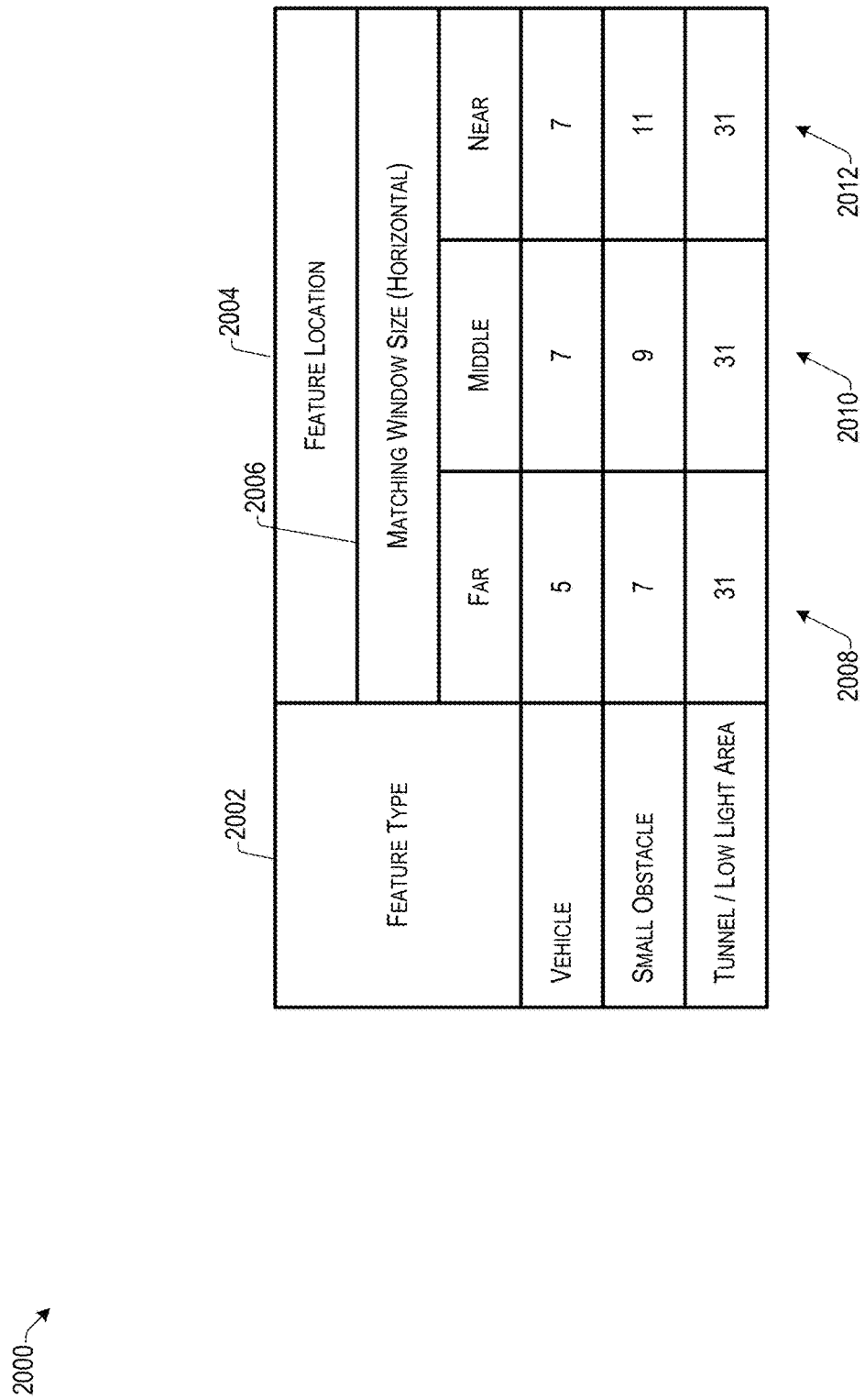
FIG. 20 illustrates an example matching-widow size table according to some implementations.

FIG. 20 illustrates an example matching-widow size table 2000 according to some implementations. After priority areas are determined based on the area selection process discussed above, e.g., with respect to FIGS. 5-8, the arm length threshold (window size) of the matching window may be selected based on the feature type and the feature distance. For example, the matching-window size table 2000 may be used to select a suitable matching window size. In this example, the matching-window size table 2000 includes a feature type 2002, a feature location 2004, and a horizontal matching window size 2008 for various different distances, such as far 2008, middle 2010, and near 2012.

FIG. 21 illustrates an example color difference threshold table 2100 according to some implementations. In this example, after priority areas are determined based on the area selection process discussed above, e.g., with respect to FIGS. 5-8, the shape of the matching window may be selected, such as based on the feature location, using the color difference threshold table 2100. In this example, the color difference threshold table 2100 may include a color difference maximum and minimum 2102, a feature location such as far 2106, middle 2108, or near 2110. For each location, a minimum value 2112 and a maximum value 2114 may be specified.

Figure 22:
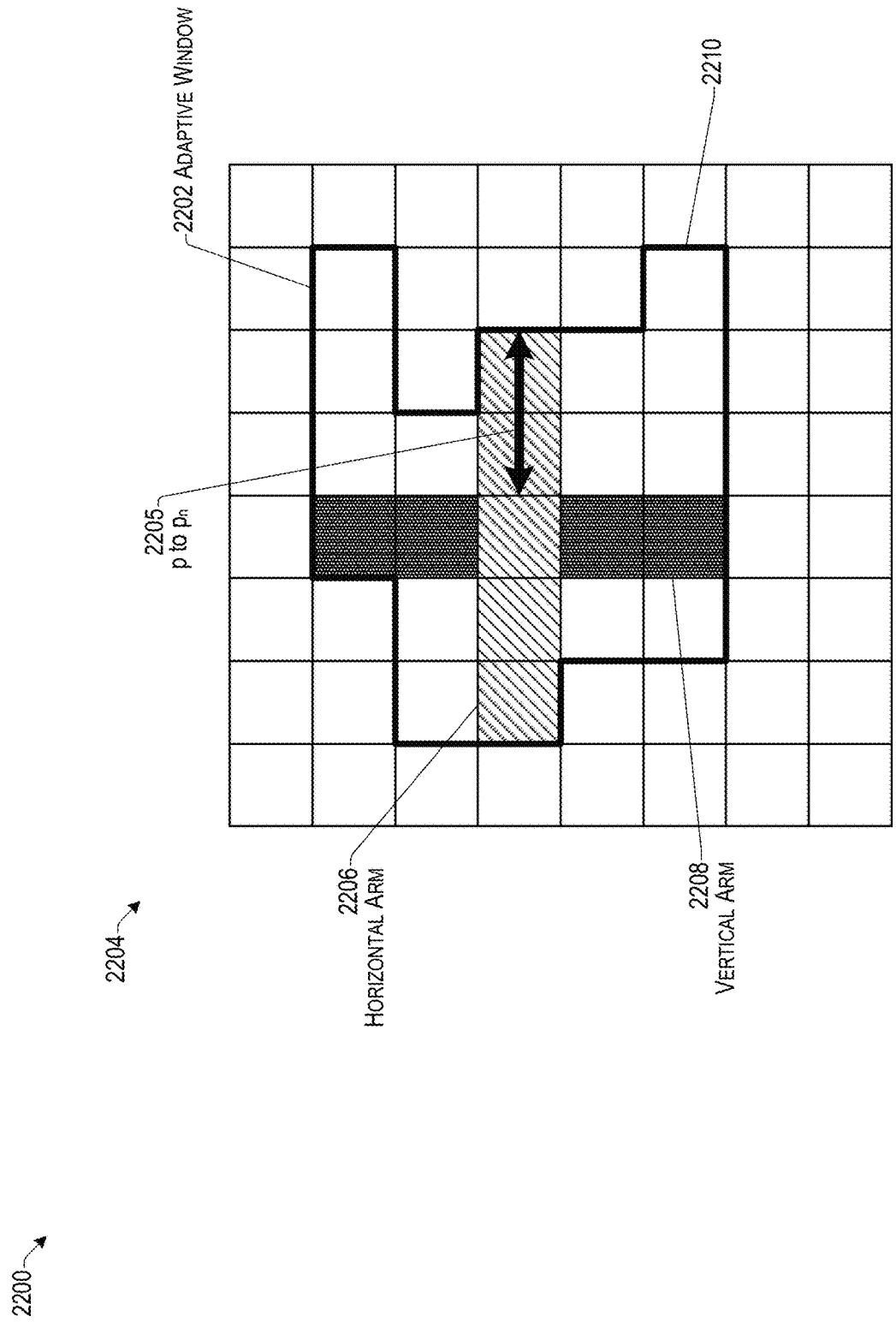
FIG. 22 illustrates an example of an adaptive window according to some implementations.

FIG. 22 illustrates an example 2200 of an adaptive window 2202 according to some implementations. For instance, the adaptive window 2202 may be defined based on pixels included in the adaptive window 2202 or excluded from the adaptive window 2202. For instance, given a plurality of pixels 2204, the adaptive window may have a horizontal arm 2206 and a vertical arm 2208, each having an arm length. The adaptive window 2202 further includes a boundary 2210 corresponding to boundaries of the pixels included in the adaptive window 2202. For instance, the size of the horizontal arm 2206 may be defined based on a number of pixels from p to $p_n$ in the horizontal direction, and the vertical arm may be similarly defined. In some cases, the plurality of pixels 2204 may correspond to the specified size of a block matching window, while the adaptive window 2202 may be defined within the block matching window.

Figure 23:
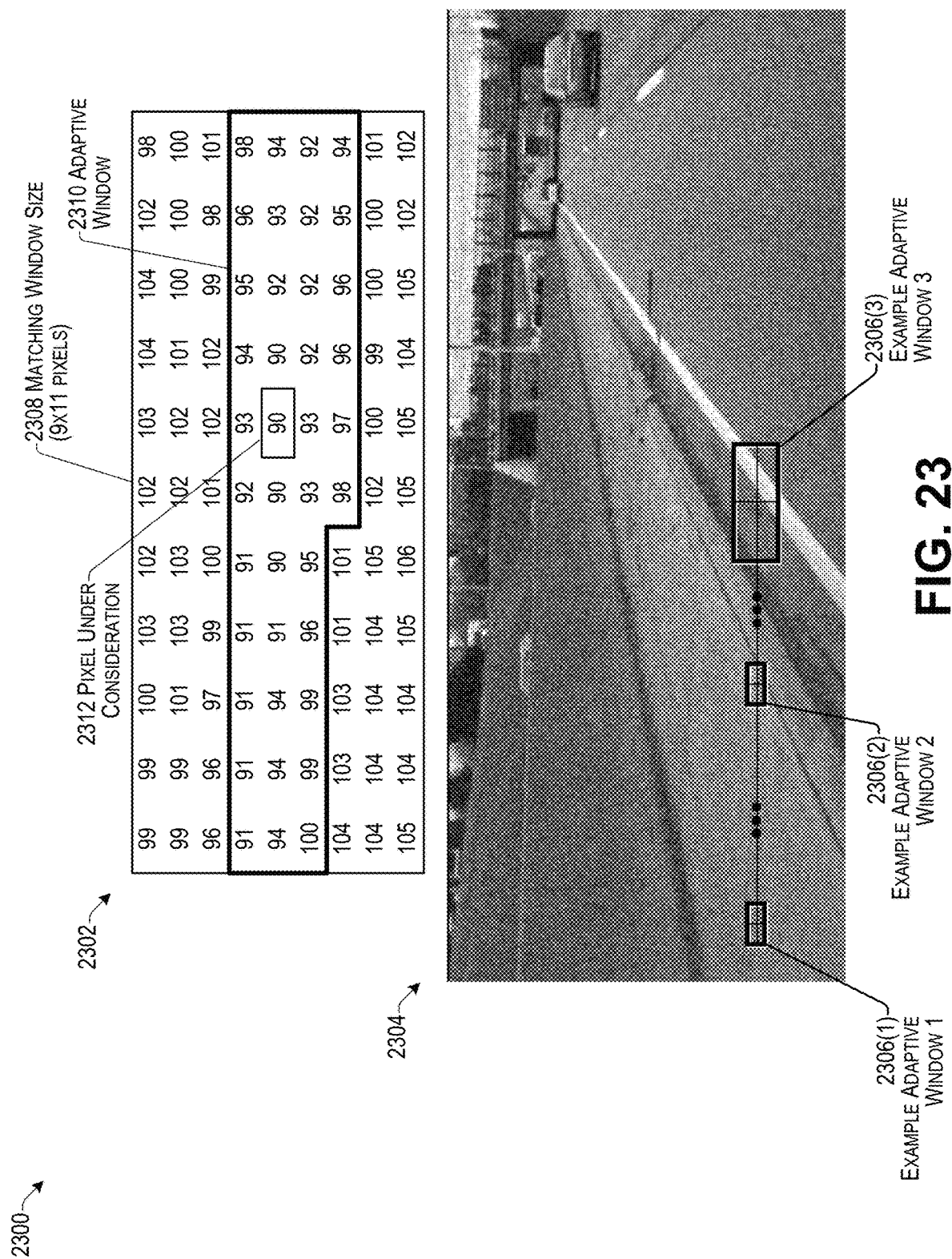
FIG. 23 illustrates an example of adaptive window generation according to some implementations.

FIG. 23 illustrates an example 2300 of adaptive window generation according to some implementations. This example shows a schematic representation of generating a matching widow in matrix format at 2302 and a corresponding image 2304 with several example adaptive windows 2306(1), 2306(2), and 2306(3) at several different locations in the image 2304. For instance, the matching window 2308 represented by the matrix 2302 may be sized at 9 pixels high×11 pixels wide, with the values in the matrix 2302 representing grey level or intensity values in some examples. In some cases, to simplify the calculations, the vertical dimension of the matching window may be fixed. However, in other examples, the vertical dimension may also be variable using the same procedure as that used for calculating the horizontal window size. For instance, once a window size and color difference threshold is selected as discussed above with respect to FIGS. 19-21, an adaptive window 2310 with an adaptive shape and size may be estimated for one of the images of the image pair, such as the left image, using Equations (3), (4) and (5) as follows:

$$D_c(p_n, p) < T_1 \text{ and } D_c(p_n, p_n+(1,0)) < T_1 \qquad \text{EQ(3)}$$

$$D_c(p_n, p) < L_1 \qquad \text{EQ(4)}$$

$$D_c(p_n, p) < T_2 \text{ if } L_2 < D_s(p_n, p) < L_1 \qquad \text{EQ(5)}$$

where:

$D_c$: Grayscale value or color value of the pixel in consideration (right & left);

$T_1$ and $T_2$: Color difference thresholds;

$D_s$: Space of the pixel in consideration (right & left); and $L_1$ and $L_2$: Space difference thresholds.

As indicated at 2312, a pixel under consideration (for which disparity needs to be calculated) is located in the $n^{th}$ column and $m^{th}$ row. Using the above equations, the horizontal arm (e.g., left and right side) and length at the $m^{th}$ row may be calculated. For example, each pixel under consideration may be compared with neighboring pixels. If all equations are true, the arm length may be increased. This process may be repeated for each row both up and down, so long as each row satisfies EQ(3), EQ(4) and EQ(5).

Figure 24:
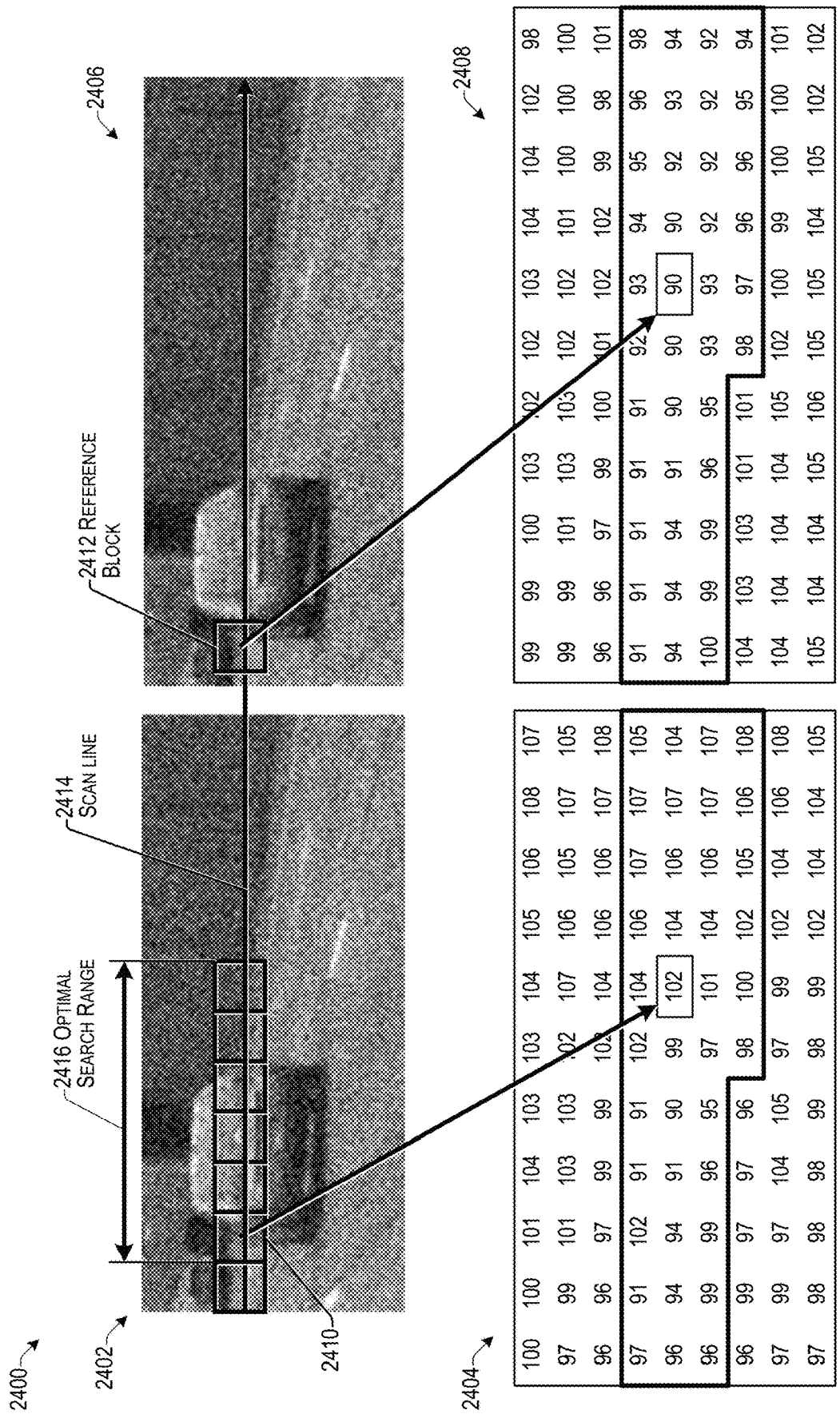
FIG. 24 illustrates an example of using an adaptive window to determine ZSAD values according to some implementations.

FIG. 24 illustrates an example 2400 of using an adaptive window to determine ZSAD values according to some implementations. In this example, ZSAD may be used as a sample cost metric technique to measure the similarities or matching cost. Additionally, or alternatively, other matching cost techniques may be applied. Unlike traditional systems in which a fixed-size matching window is used, irrespective of the situation and AD/ADAS application, in some examples herein, the adaptive window discussed above may be used to estimate the matching cost.

As one example, after the adaptive window is calculated, the same adaptive window may be used for both the left image and the right image, and the ZSAD value may be calculated using Equation (6) below until the estimated OSR is reached:

$$ZSAD = a_0 + \Sigma_{(u,v) \in w}^{\infty} (|(I_{Right}(u,v) - I'_{Right}) - |(I_{Left}(x+u, y+v) - I'_{Left}))| \quad \text{EQ(6)}$$

where $I'_{Right}$, $I'_{Left}$ mean values of the right and left images, respectively, and u and v indicate pixel locations, e.g., as discussed above with respect to equations EQ(1) and EQ(2) of FIG. 4.

Thus, in the illustrated example, a left image 2402 corresponds to a matching window 2404 represented as a 9×11 matrix, and a right image 2406 of the same scene may correspond to a matching window 2408 represented as another 9×11 matrix. An adaptive window 2410 corresponding to a reference block 2412 may be used for block matching along a scan line 2414 for determining disparity information within an optimal search range 2416, e.g., as discussed above. For instance, the adaptive block 2410 may correspond to a pixel in the matrix 2404, while the reference block 2412 may correspond to a pixel in the matrix 2408.

Figure 25:
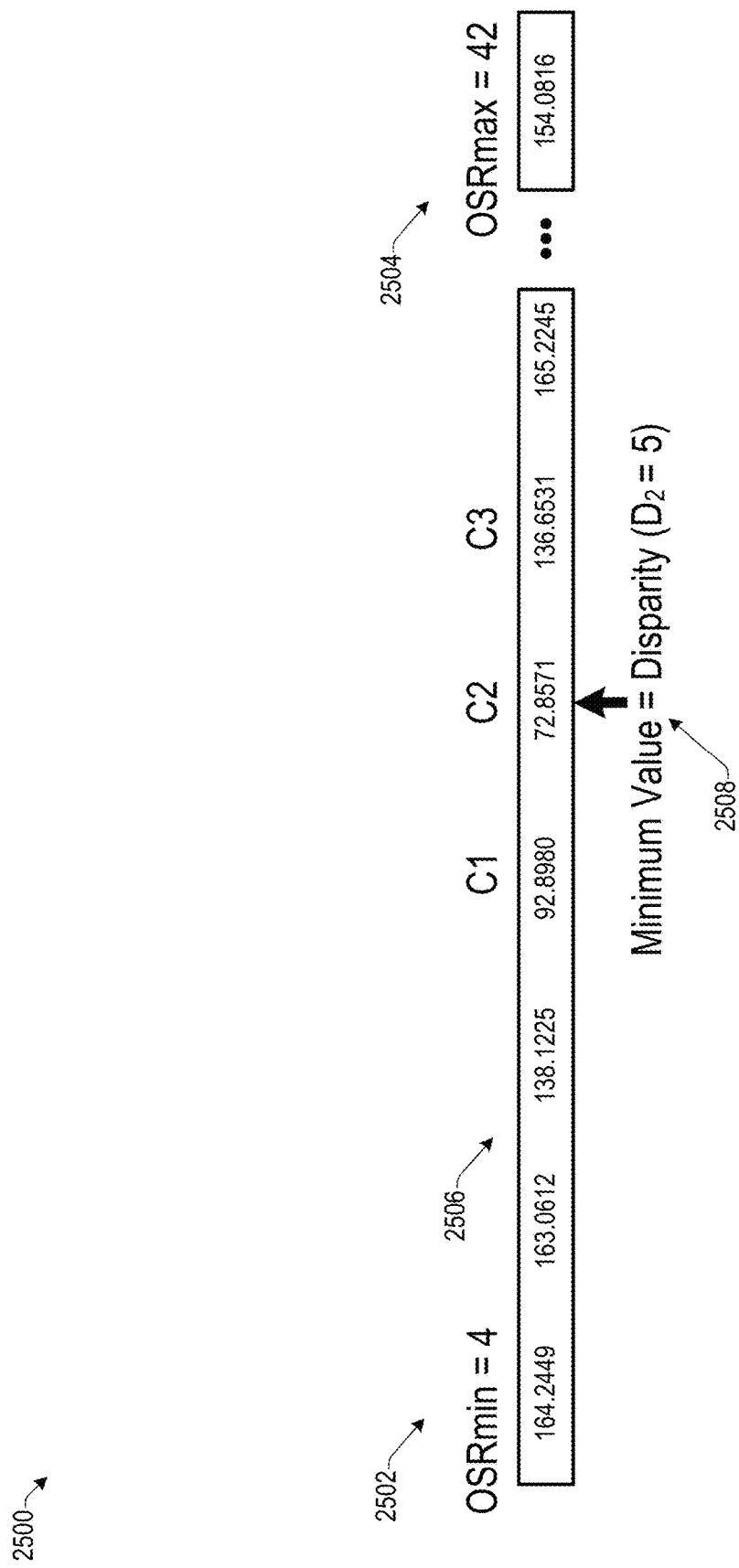
FIG. 25 illustrates an example of determining matching costs over the optimal search range according to some implementations.

FIG. 25 illustrates an example 2500 of determining matching costs over the optimal search range according to some implementations. In this example, after the ZSAD values are calculated over the optimal search range, a minimum value may be estimated and used as a sparse disparity value for the optimal search range. For example, suppose that the optimal search range minimum is 4 and maximum is 42, as indicated at 2502 and 2504, respectively. A plurality of ZSAD values 2506 may be calculated across the optimal search range, e.g., as discussed above. In this example, suppose that the value indicated at 2508 is the lowest value calculated across the search range, i.e., C2 in this example, with C1 and C3 being neighboring values. Accordingly, the minimum ZSAD value 2508 may indicate the minimum matching cost value.

Figure 26:
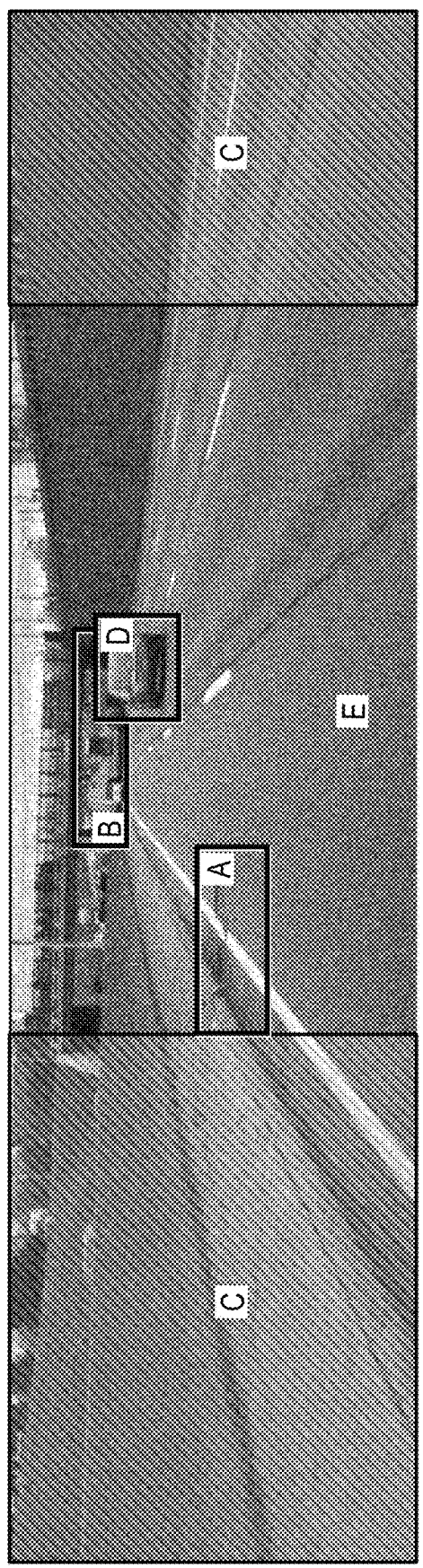
FIG. 26 illustrates an example of selected resolutions determined for areas in an image according to some implementations.

FIG. 26 illustrates an example of selected resolutions determined for areas in an image 2600 according to some implementations. In this example, after the minimum matching value is determined, depending on the resolution, sub-pixel information may also be calculated using Equation (7):

$$Disparity_{sub-pixel}(u, v) = D_2 - \frac{1}{2} * (C_3 - C_1)/(C_1 - 2C_2 + C_3) \quad \text{EQ (7)}$$

where, C2 is the position of the minimum ZSAD value, i.e., D2; and C1 and C3 are neighboring values of C2.

In some examples, the resolution of the disparity map may be selected for the areas A-E selected above, e.g., with respect to FIGS. 5-8 using a disparity resolution table as discussed below with respect to FIG. 27, which contains resolutions specified for feature types and distances. Once the resolution is selected, the disparity map may be calculated using the estimated disparity parameters discussed above, such as matching window size, color difference threshold values, optimal search range, and matching cost method (e.g., ZSAD with adaptive window or SAD).

In this example, the selected disparity resolutions for each selected area A-E are indicated at 2602. For example, area A and area B, as higher priority areas, have a 1×1 pixel dense disparity, area E has a ¼ down-sampled sparse disparity, and area C and area D have an intermediate ½ down-sampled sparse disparity.

FIG. 27 illustrates an example disparity resolution table 2700 according to some implementations. For instance, the disparity resolution table 2700 may be referred to by the recognition program 128 for determining a disparity resolution to apply to each of the selected areas of the image. In this example, the disparity resolution table 2700 includes a feature type 2702, a feature location 2704, and a disparity resolution 2706 to apply for various different distances, such as far 2708, middle 2710, and near 2712.

Figure 28:
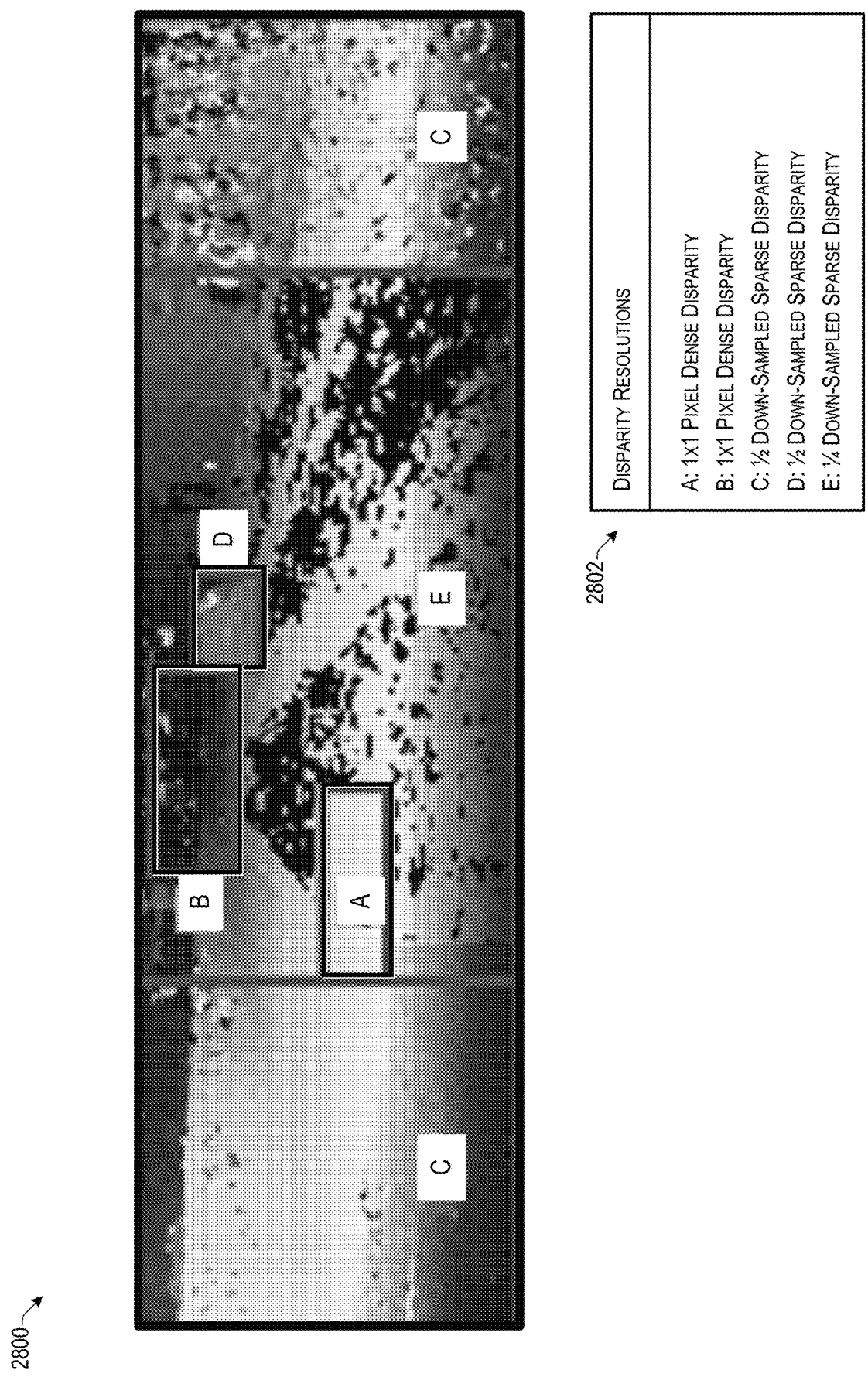
FIG. 28 illustrates an example of a dynamically reconfigured disparity map according to some implementations.

FIG. 28 illustrates an example dynamically reconfigured disparity map or disparity image 2800 according to some implementations. In this example, the system may generate a disparity map or disparity image that includes higher density disparity areas and lower density disparity areas determined in real time based on the techniques discussed above. For instance, the system may calculate the higher density disparity information only for the higher priority areas (e.g., areas A and B in this example), whereas the other regions with lower priorities may be calculated with lower density (lower resolution) of disparity information.

In this example, the disparity resolutions for each selected area A-E are indicated at 2802. For example, area A and area B, as higher priority areas, have a 1×1 pixel dense disparity, while area E has a ¼ down-sampled sparse disparity, and area C and area D have an intermediate ½ down-sampled sparse disparity. Accordingly, implementations herein are able to provide higher accuracy of recognition at the locations that are higher priority, while reducing the amount of processing resources required for doing so.

The generated dynamically reconfigured disparity map 2800 may be used for detecting obstacles and other features, as well as respective distances and/or locations of the features. The detected information and any results may be uploaded to a network storage location, such the network computing device(s) 262 discussed above with respect to FIGS. 2-3, and can be used for updating the historic data database and/or the road anomaly database. This updated information may be used subsequently by the vehicle and by other vehicles in future history maps.

The example processes described herein are only examples of processes provided for discussion purposes. Numerous other variations will be apparent to those of skill in the art in light of the disclosure herein. Further, while the disclosure herein sets forth several examples of suitable frameworks, architectures and environments for executing the processes, the implementations herein are not limited to the particular examples shown and discussed. Furthermore, this disclosure provides various example implementations, as described and as illustrated in the drawings. However, this disclosure is not limited to the implementations described and illustrated herein, but can extend to other implementations, as would be known or as would become known to those skilled in the art.

Various instructions, processes, and techniques described herein may be considered in the general context of computer-executable instructions, such as computer programs and applications stored on computer-readable media, and executed by the processor(s) herein. Generally, the terms program and application may be used interchangeably, and may include instructions, routines, modules, objects, components, data structures, executable code, etc., for performing particular tasks or implementing particular data types. These programs, applications, and the like, may be executed as native code or may be downloaded and executed, such as in a virtual machine or other just-in-time compilation execution environment. Typically, the functionality of the programs and applications may be combined or distributed as desired in various implementations. An implementation of these programs, applications, and techniques may be stored on computer storage media or transmitted across some form of communication media.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed:

1. A system comprising:
    one or more processors configured by executable instructions to perform operations comprising:
        receiving, by the one or more processors, from at least one camera of a vehicle, at least one image including a road;
        receiving, by the one or more processors, vehicle location information including an indication of a location of the vehicle;
        receiving, by the one or more processors, at least one of:
            historical information from a historical database, or
            road anomaly information, wherein the road anomaly information is determined from at least one of a road anomaly database or detected road anomaly information;
        selecting, in the at least one image, at least one higher priority area and at least one lower priority area based at least in part on the at least one of the historical information or the road anomaly information;
        at least one of:
            making a bit depth for the at least one higher priority area higher than a bit depth for the at least one lower priority area; or
            compressing the at least one lower priority area with a higher compression rate than the at least one higher priority area; and
        generating, by the one or more processors, at least one of a disparity map or disparity image based on the at least one image, the indication of the location of the vehicle, and further based on the at least one higher priority area and the at least one lower priority area selected based at least in part on the at least one of the historical information or the road anomaly information.

2. The system as recited in claim 1, the operations further comprising:
    segmenting a prior image of a frame received prior to the at least one image into at least one higher priority area and a least one lower priority area based at least in part on:
        at least one of a disparity map from the prior image or a disparity image from the prior image, and
        an edge map of the prior image;
    determining a histogram for the at least one higher priority area and the at least one lower priority area; and
    determining a search range for searching the at least one image based at least in part on the histogram.

3. The system as recited in claim 1, the operations further comprising:
    determining disparity information for the at least one image by applying a first disparity resolution to the at least one higher priority area and a second, different disparity resolution to the at least one lower priority area.

4. The system as recited in claim 1, the operations further comprising:
    determining an adaptive window to use for block matching for determining disparity information for the at least one image,
    wherein determining the adaptive window is based at least in part on comparing at least one of grayscale values or color values of pixels within the adaptive window with at the least one of grayscale values or color values, respectively, of neighboring pixels.

5. The system as recited in claim 1, the operations further comprising:
    performing recognition of one of more features in the at least one of the disparity map or disparity image to determine recognition information; and
    sending at least one control signal based on the recognition information, the at least one control signal including at least one of:
        an instruction for controlling a vehicle to cause the vehicle to accelerate or decelerate;
        an instruction for controlling the vehicle to cause the vehicle to steer a wheel of the vehicle; or
        an instruction to cause an alert to be presented.

6. A method comprising:
    receiving, by one or more processors, from at least one camera of a vehicle, at least one image including a road;
    receiving, by the one or more processors, vehicle location information including an indication of a location of the vehicle;
    receiving, by the one or more processors, at least one of:
        historical information from a historical database, or
        road anomaly information, wherein the road anomaly information is determined from at least one of a road anomaly database or detected road anomaly information;
    selecting, in the at least one image, at least one higher priority area and at least one lower priority area based at least in part on the at least one of the historical information or the road anomaly information;
    at least one of:
        making a bit depth for the at least one higher priority area higher than a bit depth for the at least one lower priority area; or compressing the at least one lower priority area with a higher compression rate than the at least one higher priority area; and generating, by the one or more processors, at least one of a disparity map or disparity image based on the at least one image, the indication of the location of the vehicle, and further based on the at least one higher priority area and the at least one lower priority area selected based at least in part on the at least one of the historical information or the road anomaly information.

7. The method as recited in claim 6, further comprising:
segmenting a prior image of a frame received prior to the at least one image into at least one higher priority area and a least one lower priority area based at least in part on:
at least one of a disparity map from the prior image or a disparity image from the prior image, and
an edge map of the prior image;
determining a histogram for the at least one higher priority area and the at least one lower priority area; and
determining a search range for searching the at least one image based at least in part on the histogram.

8. The method as recited in claim 6, further comprising:
determining disparity information for the at least one image by applying a first disparity resolution to the at least one higher priority area and a second, different disparity resolution to the at least one lower priority area.

9. The method as recited in claim 6, further comprising:
determining an adaptive window to use for block matching for determining disparity information for the at least one image,
wherein determining the adaptive window is based at least in part on comparing at least one of grayscale values or color values of pixels within the adaptive window with at the least one of grayscale values or color values, respectively, of neighboring pixels.

10. The method as recited in claim 6, wherein the historical information includes at least one of: current sensed operator monitoring information, past operator monitoring information, current vehicle lights activity, past vehicle lights activity, past steering wheel position information, current steering wheel position information, past traffic information, or current traffic information.

11. The method as recited in claim 6, wherein the historical information includes at least one of: current sensed operator monitoring information, past operator monitoring information, current vehicle lights activity, past vehicle lights activity, past steering wheel position information, current steering wheel position information, past traffic information, or current traffic information.

12. The method as recited in claim 6, further comprising:
performing recognition of one of more features in the at least one of the disparity map or disparity image to determine recognition information; and
sending at least one control signal based on the recognition information, the at least one control signal including at least one of:
an instruction for controlling a vehicle to cause the vehicle to accelerate or decelerate;
an instruction for controlling the vehicle to cause the vehicle to steer a wheel of the vehicle; or
an instruction to cause an alert to be presented.

13. One or more non-transitory computer readable media storing instructions executable by one or more processors to configure the one or more processors to perform operations comprising:

receiving, from at least one camera of a vehicle, at least one image including a road;
receiving vehicle location information including an indication of a location of the vehicle;
receiving at least one of:
historical information from a historical database, or
road anomaly information from a road anomaly database, wherein the road anomaly information is determined from at least one of a road anomaly database or detected road anomaly information;
selecting, in the at least one image, at least one higher priority area and at least one lower priority area based at least in part on the at least one of the historical information or the road anomaly information;
at least one of:
making a bit depth for the at least one higher priority area higher than a bit depth for the at least one lower priority area; or
compressing the at least one lower priority area with a higher compression rate than the at least one higher priority area; and
generating at least one of a disparity map or a disparity image based on the at least one image, the indication of the location of the vehicle, and further based on the at least one higher priority area and the at least one lower priority area selected based at least in part on the at least one of the historical information or the road anomaly information.

14. The one or more non-transitory computer readable media as recited in claim 13, the operations further comprising:
segmenting a prior image of a frame received prior to the at least one image into at least one higher priority area and a least one lower priority area based at least in part on:
at least one of a disparity map from the prior image or a disparity image from the prior image, and
an edge map of the prior image;
determining a histogram for the at least one higher priority area and the at least one lower priority area; and
determining a search range for searching the at least one image based at least in part on the histogram.

15. The one or more non-transitory computer readable media as recited in claim 13, the operations further comprising:
determining disparity information for the at least one image by applying a first disparity resolution to the at least one higher priority area and a second, different disparity resolution to the at least one lower priority area.

16. The one or more non-transitory computer readable media as recited in claim 13, the operations further comprising:
determining an adaptive window to use for block matching for determining disparity information for the at least one image,
wherein determining the adaptive window is based at least in part on comparing at least one of grayscale values or color values of pixels within the adaptive window with at the least one of grayscale values or color values, respectively, of neighboring pixels.

17. The one or more non-transitory computer readable media as recited in claim 13, wherein the historical information includes at least one of: current sensed operator monitoring information, past operator monitoring information, current vehicle lights activity, past vehicle lights activity, past steering wheel position information, current steering wheel position information, past traffic information, or current traffic information.

18. The one or more non-transitory computer readable media as recited in claim 13, the operations further comprising:
performing recognition of one of more features in the at least one of the disparity map or disparity image to determine recognition information; and
sending at least one control signal based on the recognition information, the at least one control signal including at least one of:
an instruction for controlling a vehicle to cause the vehicle to accelerate or decelerate;
an instruction for controlling the vehicle to cause the vehicle to steer a wheel of the vehicle; or
an instruction to cause an alert to be presented.

* * * * *